US012009493B2

(12) United States Patent
McHugh et al.

(10) Patent No.: US 12,009,493 B2
(45) Date of Patent: *Jun. 11, 2024

(54) INDUCTIVE HEATING OF BATTERIES FOR CHARGING

(71) Applicant: MILWAUKEE ELECTRIC TOOL CORPORATION, Brookfield, WI (US)

(72) Inventors: Randolph H. McHugh, Sullivan, WI (US); Gareth Mueckl, Milwaukee, WI (US); Tauhira Hoossainy, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 298 days.

This patent is subject to a terminal disclaimer.

(21) Appl. No.: 17/492,999

(22) Filed: Oct. 4, 2021

(65) Prior Publication Data
US 2022/0029218 A1     Jan. 27, 2022

Related U.S. Application Data

(63) Continuation of application No. 16/442,867, filed on Jun. 17, 2019, now Pat. No. 11,152,655.
(Continued)

(51) Int. Cl.
*H02J 7/00*   (2006.01)
*H01M 10/48*  (2006.01)
(Continued)

(52) U.S. Cl.
CPC ....... *H01M 10/615* (2015.04); *H01M 10/486* (2013.01); *H01M 10/6235* (2015.04);
(Continued)

(58) Field of Classification Search
None
See application file for complete search history.

(56) References Cited

U.S. PATENT DOCUMENTS

| 3,654,426 A | 4/1972 | Brinkmann et al. |
| 4,081,737 A | 3/1978 | Miyahara |

(Continued)

FOREIGN PATENT DOCUMENTS

| CN | 202888352 U | 4/2013 |
| CN | 204596904 U | 8/2015 |

(Continued)

OTHER PUBLICATIONS

Extended European Search Report for Application No. 19823743.0 dated Mar. 3, 2022 (9 pages).
(Continued)

*Primary Examiner* — Arun C Williams
(74) *Attorney, Agent, or Firm* — Michael Best & Friedrich LLP

(57) ABSTRACT

A battery pack charger configured to heat a power tool battery pack, the battery pack charger comprising a housing, an adapter portion integrated with the housing of the battery pack charger, the adapter portion configured to mechanically and electrically connect to the power tool battery pack, and an inductive heater including a coil portion, the coil portion including a coil housing and one or more inductive coil windings, the inductive heater configured to generate an electromagnetic field to heat the power tool battery pack.

20 Claims, 32 Drawing Sheets

Related U.S. Application Data

(60) Provisional application No. 62/686,111, filed on Jun. 18, 2018.

(51) Int. Cl.
 | | |
 |---|---|
 | *H01M 10/615* | (2014.01) |
 | *H01M 10/6235* | (2014.01) |
 | *H01M 10/657* | (2014.01) |
 | *H05B 6/04* | (2006.01) |
 | *H05B 6/06* | (2006.01) |
 | *H05B 6/44* | (2006.01) |
 | *H01M 50/213* | (2021.01) |

(52) U.S. Cl.
 CPC ......... *H01M 10/657* (2015.04); *H02J 7/0042* (2013.01); *H05B 6/04* (2013.01); *H05B 6/06* (2013.01); *H05B 6/44* (2013.01); *H01M 50/213* (2021.01); *H01M 2220/30* (2013.01)

(56) References Cited

U.S. PATENT DOCUMENTS

| | | |
|---|---|---|
| 5,280,229 A | 1/1994 | Faude et al. |
| 6,002,240 A | 12/1999 | McMahan et al. |
| 7,446,508 B2 | 11/2008 | Aradachi et al. |
| 2002/0070710 A1 | 6/2002 | Yagi et al. |
| 2004/0070369 A1* | 4/2004 | Sakakibara ............... B25F 5/00 320/128 |
| 2006/0220620 A1 | 10/2006 | Aradachi et al. |
| 2009/0212637 A1* | 8/2009 | Baarman ................. H01F 38/14 307/104 |
| 2011/0052944 A1 | 3/2011 | Matthias et al. |
| 2013/0106361 A1 | 5/2013 | Wissmach |
| 2014/0117922 A1 | 5/2014 | Pham |
| 2014/0159640 A1 | 6/2014 | Yoshikawa et al. |
| 2014/0327396 A1 | 11/2014 | Rejman et al. |
| 2017/0047627 A1 | 2/2017 | Englert |

FOREIGN PATENT DOCUMENTS

| | | |
|---|---|---|
| CN | 103985831 B | 3/2016 |
| CN | 206412445 U | 8/2017 |
| DE | 102011002729 A1 | 7/2012 |
| DE | 102012206623 A1 | 10/2013 |
| JP | H06217466 A | 8/1994 |
| JP | H11055869 A | 2/1999 |
| JP | 2007227209 A | 9/2007 |
| KR | 20180035269 A | 4/2018 |
| WO | 2012095331 A1 | 7/2012 |

OTHER PUBLICATIONS

International Search Report and Written Opinion for Related Application No. PCT/US2019/037442 dated Oct. 1, 2019 (10 pages).

\* cited by examiner

INDUCTIVE HEATING OF BATTERIES FOR CHARGING

RELATED APPLICATIONS

This application is a continuation of U.S. patent application Ser. No. 16/442,867, filed Jun. 17, 2019, which claims the benefit of U.S. Provisional Patent Application No. 62/686,111, filed Jun. 18, 2018, the entire content of each of which is hereby incorporated by reference.

FIELD

This application relates to battery packs and, more particularly, to an apparatus and method of heating battery packs to be charged in cold weather.

SUMMARY

Many electrical devices (e.g., power tools, outdoor tools, other motorized or non-motorized devices) powered by battery packs including lithium-based battery cells must operate all day in environments below the optimum charging temperatures and may then sit all night in adverse/cold weather conditions. These devices and the associated battery packs are generally required to become operable within a short time period.

In order to maintain capacity and performance, lithium-based battery cells typically should not be charged below a certain temperature threshold. However, as mentioned above, charging of battery packs including such cells and operation of tools and devices powered by such cells are often desired in cold environments.

In some embodiments, a system may be provided for heating a battery pack, the battery pack including a pack interface for mechanical and electrical connection to an electrical device (e.g., a power tool) to be powered by the battery pack. The system may generally include a battery charger operable to charge the battery pack and having a charger interface mechanically and electrically connectable to the pack interface, and an inductive heater assembly connectable between the charger and the battery pack and operable to inductively heat the battery pack, the heater assembly including an adapter portion with a first interface mechanically and electrically connectable to the charger interface, and a second interface mechanically and electrically connectable to the pack interface, a circuit operable to receive power from the charger, and a coil winding operable to receive power from the circuit and generate an inductive field to heat the battery pack before charging.

In some embodiments, the heater assembly may be operable to heat the battery pack when a temperature of the battery pack is less than or equal to a charging temperature threshold. In some embodiments, the heater assembly may also be operable to charge the battery pack when the temperature of the battery pack exceeds the charging temperature threshold.

In some embodiments, the battery pack may be connected to the second interface along an axis, and the coil winding may be movable between a first position extending across the axis and a second position spaced from the axis. The heater assembly may include an adapter housing providing the second interface and a coil housing supporting the coil winding, the coil housing being movable relative to the adapter housing (e.g., pivotable) between the first position and the second position.

In some embodiments, an inductive heater assembly operable to heat a battery pack may be provided, the battery pack including a pack interface for mechanical and electrical connection to an electrical device to be powered by the battery pack. The heater assembly may generally include a housing with an interface mechanically and electrically connectable to the pack interface, a circuit operable to receive power from a power source (e.g., a charger for the battery pack), and a coil winding operable to receive power from the circuit and generate an inductive field to heat the battery pack.

In some embodiments, a method of inductively heating a battery pack may be provided. The battery pack may include a pack interface for mechanical and electrical connection to an electrical device (e.g., a power tool) to be powered by the battery pack. The method may generally include providing a battery charger operable to charge the battery pack and having a charger interface mechanically and electrically connectable to the pack interface; providing an inductive heater assembly including an adapter portion with a first interface mechanically and electrically connectable to the charger interface, and a second interface mechanically and electrically connectable to the pack interface, a circuit, and a coil winding operable to generate an inductive field; connecting the first interface to the charger interface; connecting the pack interface to the second interface; supplying power from the charger to the circuit; and supplying power from the circuit to the coil winding to cause the coil winding to generate the inductive field to heat the battery pack.

In some embodiments, the method may further include, before supplying power from the circuit to the coil winding, determining whether a temperature of the battery pack is less than or equal to a charging temperature threshold, and, when the temperature of the battery pack is less than or equal to a charging temperature threshold, supplying power from the circuit to the coil winding to cause the coil winding to generate the inductive field to heat the battery pack. In some embodiments, the method may further include, when the temperature of the battery pack exceeds the charging temperature threshold, supplying power from the charger to the circuit to charge the battery pack.

In some embodiments, the battery pack may be connected to the second interface along an axis, and the method may further include, before connecting the pack interface to the second interface, moving the coil winding from a first position extending across the axis to a second position spaced from the axis; and, after connecting the pack interface to the second interface, moving the coil winding from the second position to the first position. The heater assembly may include an adapter housing providing the second interface and a coil housing supporting the coil winding, and moving the coil winding may include moving the coil housing relative to the adapter housing (e.g., pivoting) between the first position and the second position.

Embodiments described herein provide an inductive heater assembly for heating a power tool battery pack. The inductive heater assembly includes an adapter portion and a coil portion. The adapter portion includes a first adapter support portion and a second adapter support portion. The first adapter support portion is configured to mechanically and electrically connect the inductive heater assembly to a power source device. The first adapter support portion includes a first adapter terminal block configured to engage a complementary terminal block of the power source device. The second adapter support portion is configured to mechanically and electrically connect the inductive heater assembly to the power tool battery pack. The second adapter support portion includes a second adapter terminal block configured to engage a complementary terminal block of the power tool battery pack. The coil portion is supported by the adapter portion. The coil portion includes a coil housing and one or more inductive coil windings. The one or more inductive coil windings are configured to generate an electromagnetic field.

Embodiments described herein provide an inductive heating system. The inductive heating system includes a power tool battery pack and an enclosure. The power tool battery pack includes a power tool battery pack terminal block. The enclosure includes at least one inductive heater assembly internal to the enclosure. The at least one inductive heater assembly includes an adapter portion electrically connecting the at least one inductive heater assembly to the enclosure, an adapter support portion configured to mechanically and electrically connect the inductive heater assembly to the power tool battery pack, and a coil portion including a coil housing and one or more inductive coil windings. The adapter support portion includes an adapter terminal block configured to engage the power tool battery pack terminal block. The one or more inductive coil windings are configured to generate an electromagnetic field.

Embodiments described herein provide a method of inductively heating a power tool battery pack. The power tool battery pack includes at least one battery cell having an outer case. The method includes mechanically and electrically connecting an inductive heater assembly to a power source device with a first adapter support portion. The first adapter support portion includes a first adapter terminal block configured to engage a complementary terminal block of the power source device. The method also includes mechanically and electrically connecting the inductive heater assembly to the power tool battery pack with a second adapter support portion. The second adapter support portion includes a second adapter terminal block configured to engage a complementary terminal block of the power tool battery pack. The method also includes generating an electromagnetic field with a coil winding included within a coil housing of a coil portion of the inductive heater assembly. The electromagnetic field is operable to generate an eddy current in the outer case of the at least one battery cell.

Before any independent embodiments of the application are explained in detail, it is to be understood that the application is not limited to the details of embodiment and the arrangement of components set forth in the following description or illustrated in the following drawings. The application is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Other independent aspects of the application may become apparent by consideration of the detailed description and accompanying drawings.

DETAILED DESCRIPTION

Figure 1:
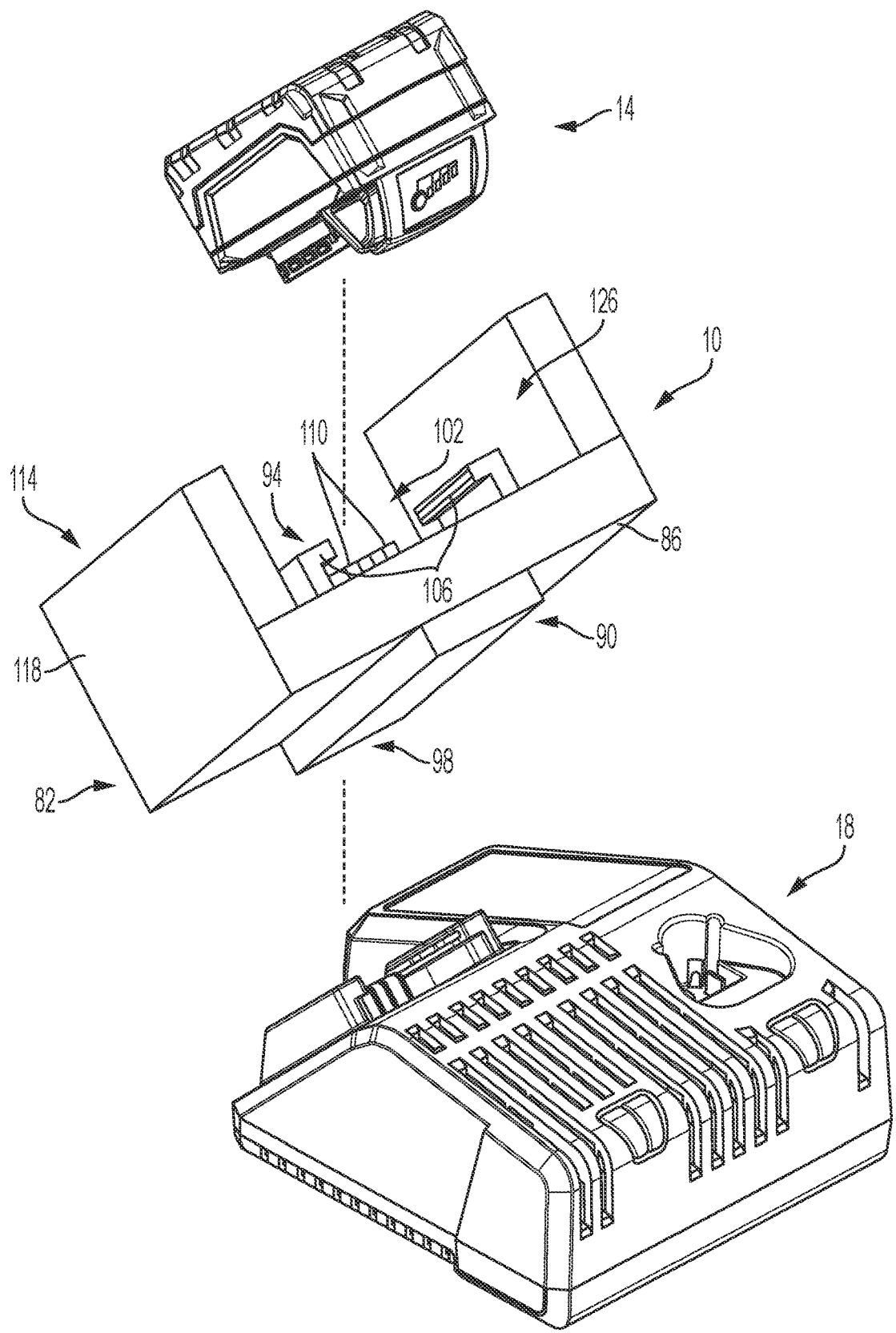
FIG. 1 is perspective view of an inductive heater assembly for a battery pack and operable with a battery charger, according to embodiments described herein.
Figure 2:
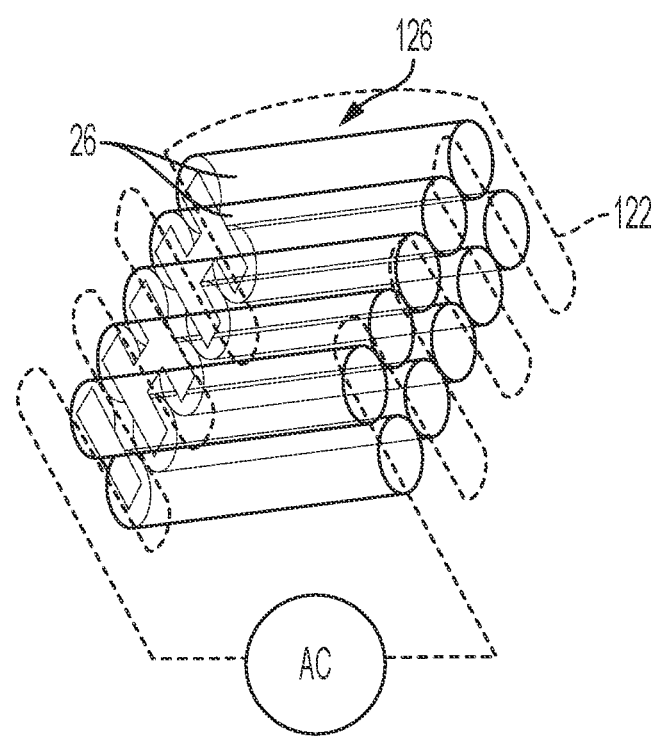
FIG. 2 is a schematic diagram of coil windings around a plurality of battery cells of the battery pack of FIG. 1.
Figure 3:
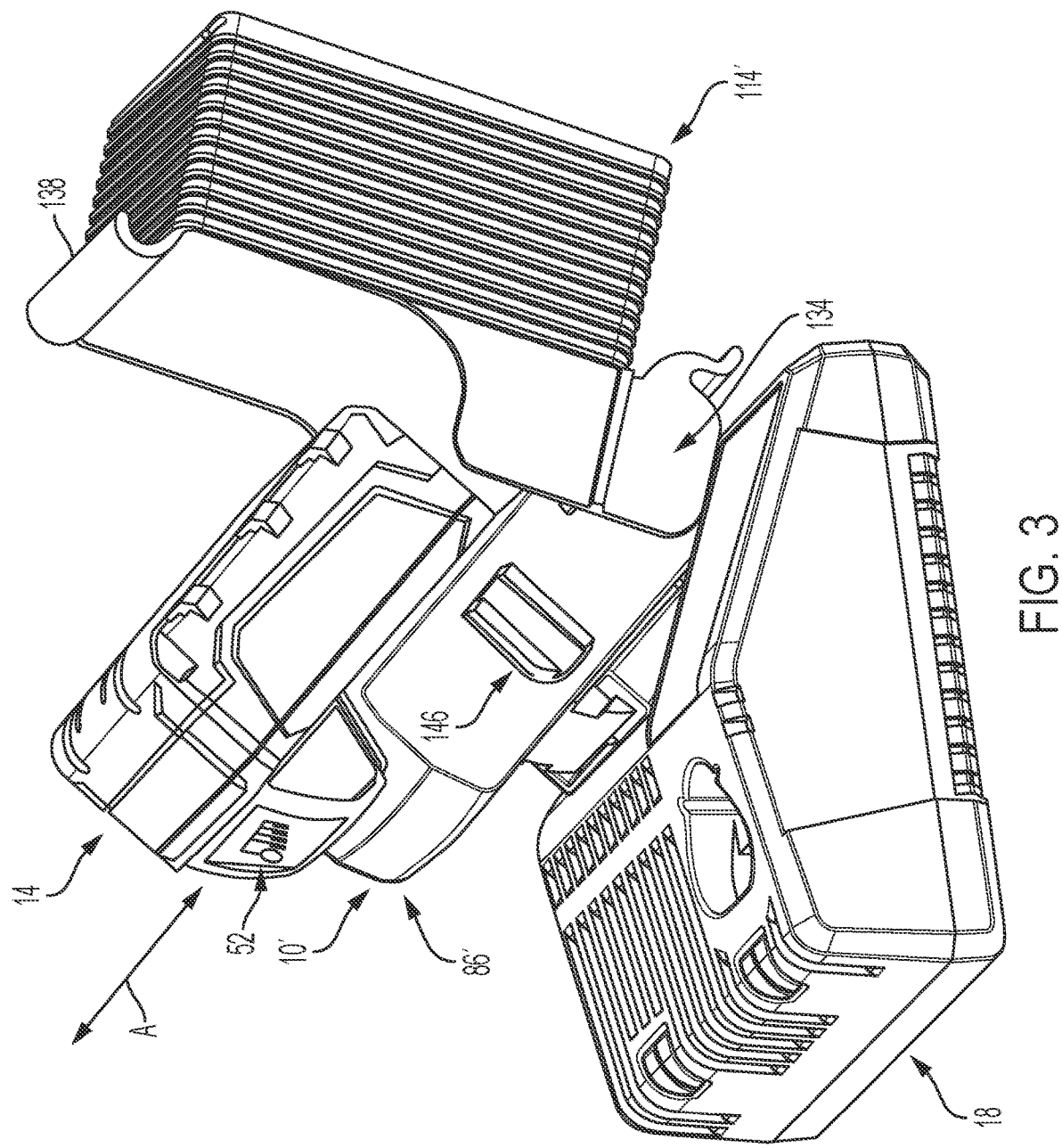
FIG. 3 is a front perspective view of an alternative embodiment of an inductive heater assembly with a coil portion illustrated in an open position, according to embodiments described herein.
Figure 4:
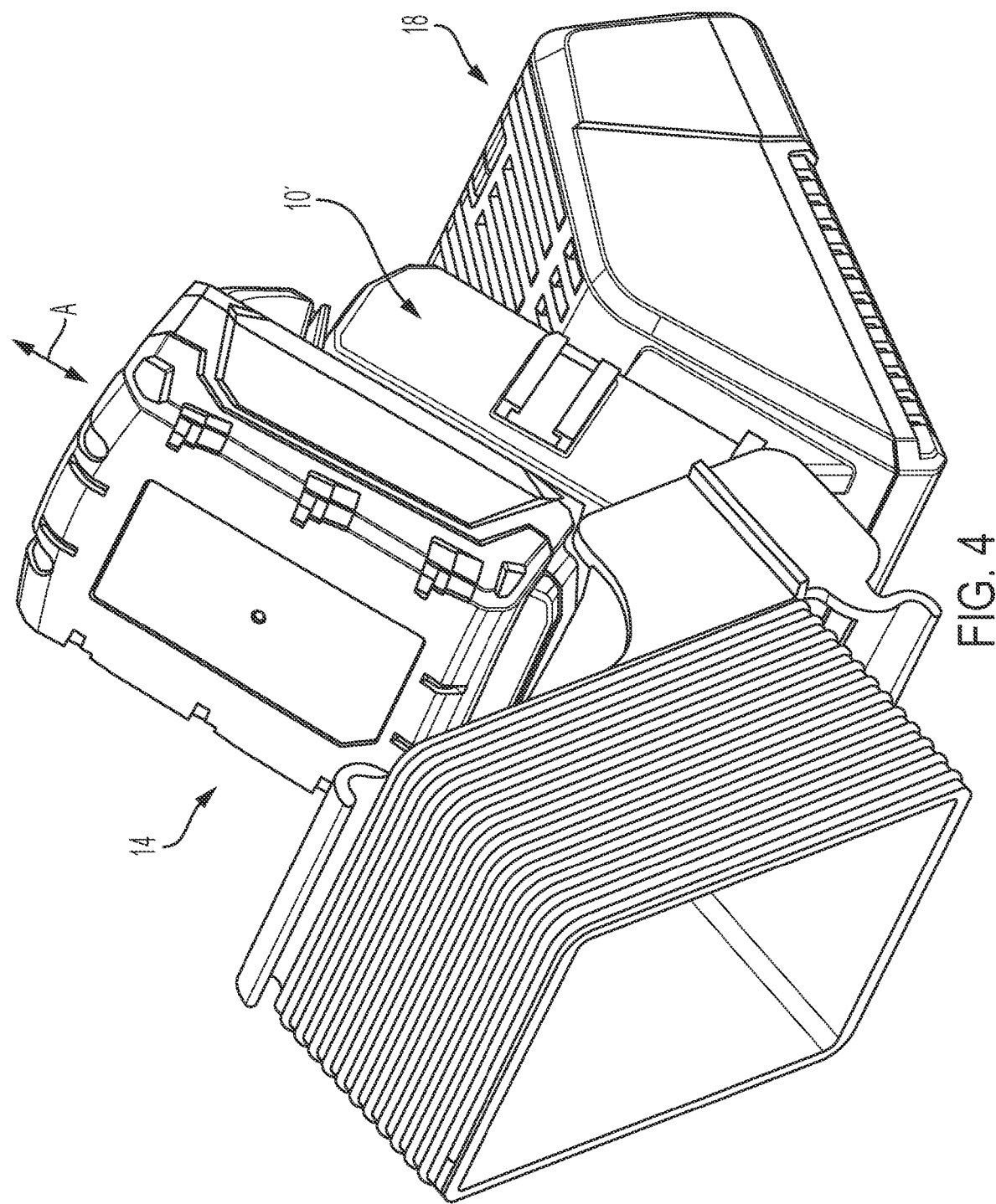
FIG. 4 is a rear perspective view of heater assembly of FIG. 3 with the coil portion illustrated in the open position.

In the illustrated embodiments, an inductive heater assembly 10, 10' is operable to heat a battery pack 14 via inductive heating. FIGS. 1-2 illustrate one embodiment of the heater assembly 10. FIGS. 3-12 illustrate another embodiment of an inductive heater assembly 10' with common elements having the same reference number "'". The battery pack 14 is rechargeable by a battery charger 18, and, in the illustrated embodiment, the inductive heater assembly 10, 10' is electrically and mechanically connectable between the battery pack 14 and the charger 18 and operable to heat cells of the battery pack 14. In other embodiments (not shown), the heater assembly 10, 10' may be operated separately from the charger 18 (e.g., without the charger 18 at all) and/or receive power from another source than the charger 18 (e.g., a separate power cord/wall plug).

When the battery pack 14 is below a predetermined threshold temperature (e.g., a threshold at or below which charging may cause damage to or impede/reduce performance of the battery pack 14; for example, about 5 degrees Celsius [° C.]), the heater assembly 10 receives power (e.g., from the charger 18, from a separate power source [not shown], etc.) to heat the battery pack 14 before charging. When the battery pack 14 is above the predetermined temperature threshold, the charger 18 provides power (e.g., through the illustrated heater assembly 10, 10', a separate current path [not shown], etc.) to charge the battery pack 14. In other embodiments (not shown), the heater assembly 10, 10' may only be operable to heat the battery pack 14 and may be bypassed (e.g., electrically) or removed for charging. The illustrated heater assembly 10 may also heat the battery pack 14 during charging and/or after charging, as necessary.

Figure 15:
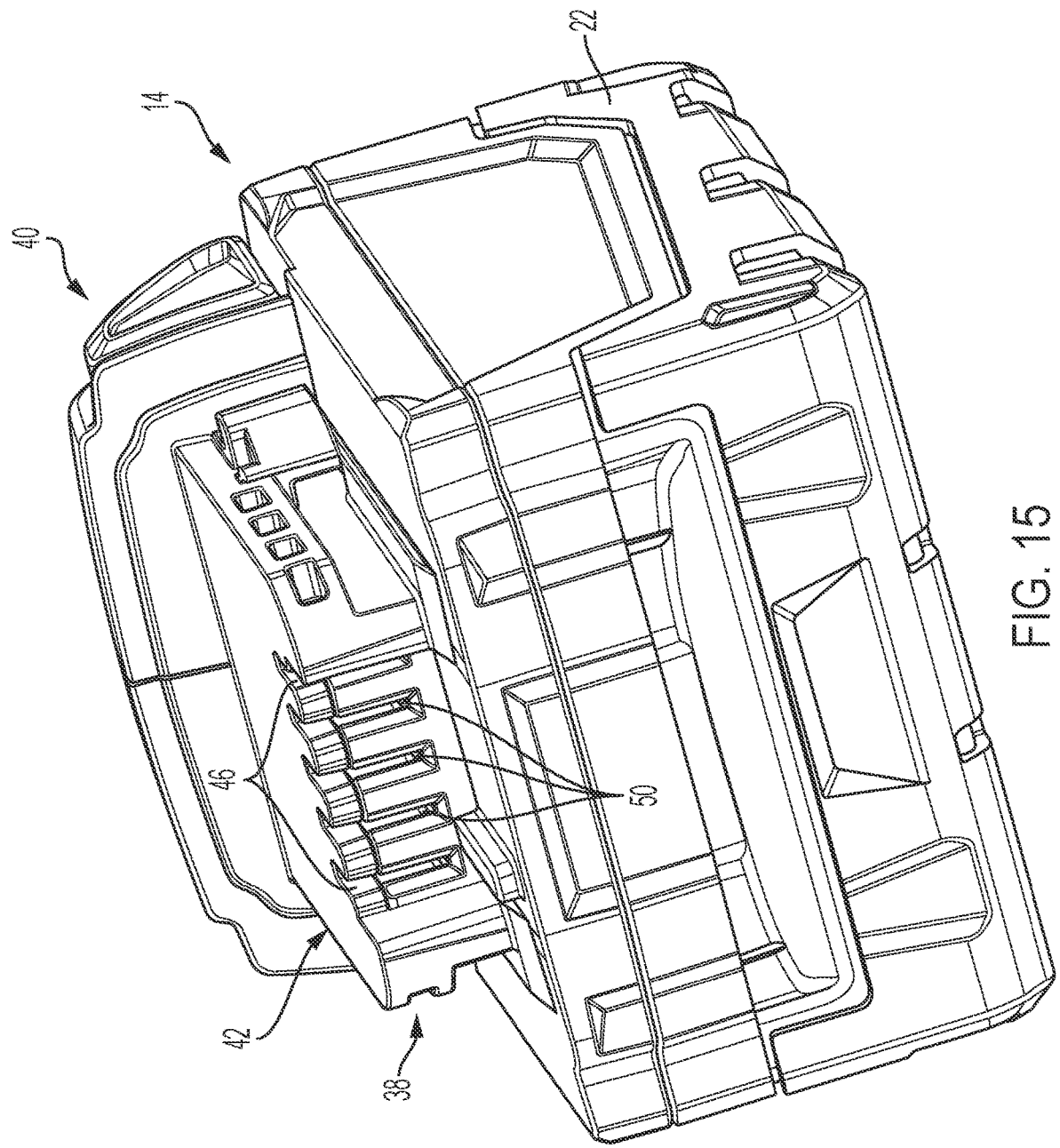
FIG. 15 is a top perspective view of a battery pack to be heated by the heater assembly of FIG. 1 or FIG. 3.

The illustrated battery pack 14 is operable to supply power to an electrical device (not shown), such as a power tool, an outdoor tool, or another motorized or non-motorized device. The battery pack 14 includes (see FIGS. 1-2 and 15) a housing 22 supporting battery cells 26 to provide power to the electrical device and to be charged by the charger 18. The battery cells 26 are electrically connected to provide the desired output (e.g., nominal voltage, current capacity, etc.) of the battery pack 14.

Figure 16:
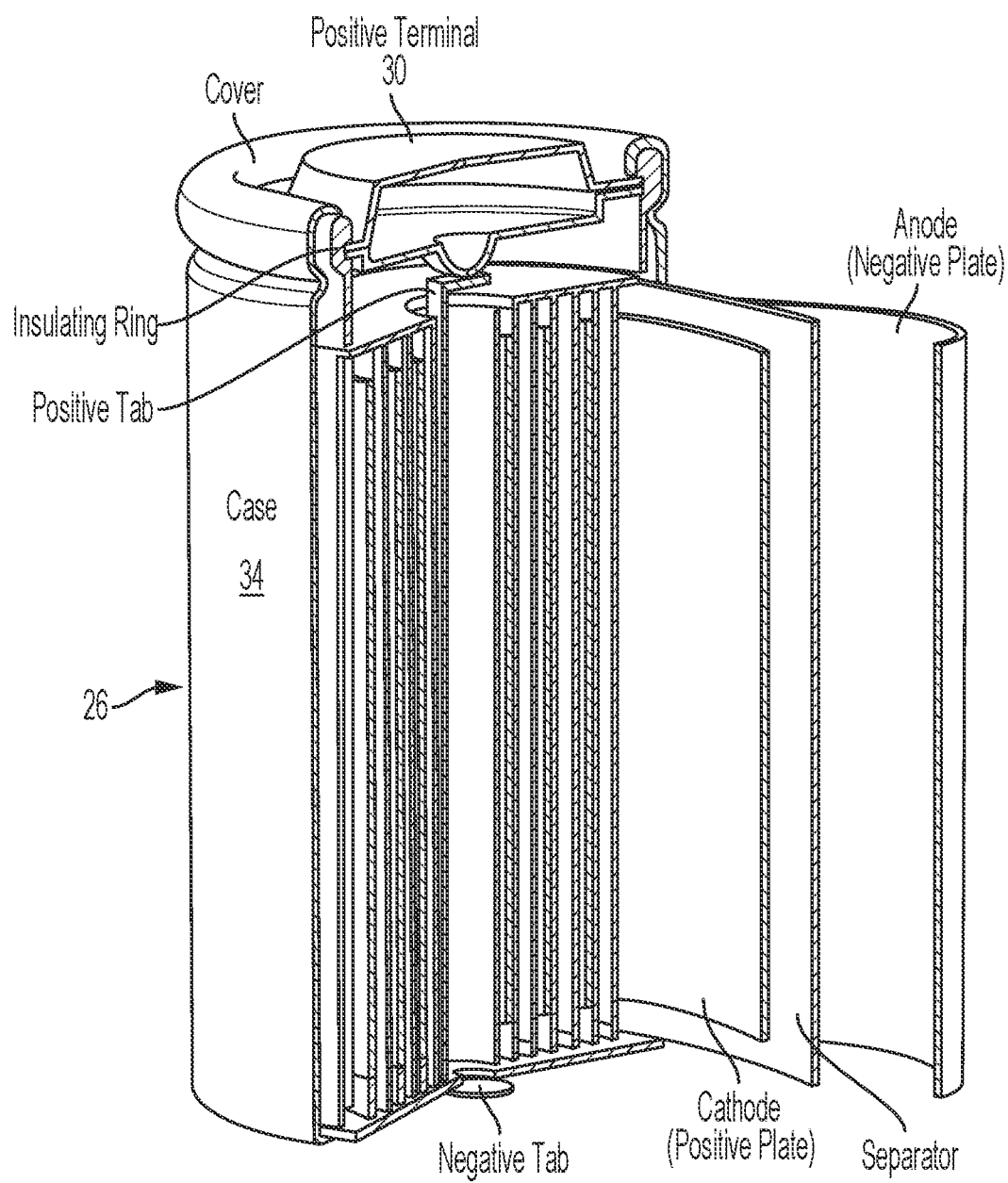
FIG. 16 is a diagram of components in an individual battery cell within the battery pack of FIG. 15.

FIG. 16 illustrates a lithium ion battery cell from Chris Hillseth Enterprises (http://christhillsethenterprises.com/battery/about-lithium-ion-battery-manufacturing/). As shown in FIG. 16, each battery cell 26 includes an anode (negative plate) and a cathode (positive plate), and electrolyte (not shown) allows for ionic movement between the anode and cathode. The battery cell 26 includes a positive terminal 30 and a negative terminal provided by the outer case 34. In the illustrated embodiment, the case 34 is made of steel, which facilitates the induction of eddy currents from a generated electromagnetic field of the heater assembly 10, 10'. In other embodiments (not shown), other conductive material may be used in the case 34.

Each battery cell 26 may have a nominal voltage between about 3 volts (V) and about 5 V. The battery pack 14 may have a nominal capacity between about 3 Amp-hours (Ah) (e.g., for a battery pack with one string of five series-connected battery cells 26 [a "5S1P" pack]) and about 5 Ah (e.g., for a 5S2P pack) or more (e.g., about 9 Ah for a 5S3P pack). In the illustrated embodiment, the battery cells 26 are rechargeable and have a Lithium-based chemistry (e.g., Lithium [Li], Lithium-ion [Li-ion], other Lithium-based chemistry, etc.). In other embodiments, the battery cells 26 may have a different chemistry such as, for example, Nickel-Cadmium (NiCd), Nickel-Metal Hydride (NiMH), etc.

The housing 22 (see FIG. 15) provides a support portion 38 for connection to the electrical device, the charger 18, and, as explained below, the heater assembly 10, 10'. The illustrated support portion 38 provides a slide-on interface with rails and grooves extending along an attachment axis A (see FIGS. 3-4). In other embodiments (not shown), the battery pack 14 may have a different configuration, such as a tower-style configuration in which the battery pack 14 is connected along the axis of the tower portion. A latch assembly 40 is provided to releasably connect the battery pack 14 at least to the electrical device.

A terminal block 42 includes female power terminals 46 electrically connected to the cells 26 to facilitate transfer of power from/to the cells 26. In the illustrated embodiment, the terminal block 42 includes one or more female communication terminals 50 to transmit information between the battery pack 14 (e.g., a battery pack controller [not shown], a thermistor [not shown]) and the electrical device, the charger 18 and/or the heater assembly 10, 10'.

In the illustrated embodiment, the battery pack 14 includes a battery pack controller (not shown) operable to, for example, determine information regarding the battery pack 14 (e.g., the state-of-charge, temperature, etc. of the battery pack 14 and/or of each cell 26), to communicate information, to control operation of the battery pack 14, etc. The battery pack 14 includes one or more temperature sensors (e.g., a thermistor [not shown]) operable to determine a temperature of the battery pack 14. The illustrated battery pack 14 includes (see FIG. 3) an indicator 52 (e.g., one or more light-emitting diodes [LEDs]) operable to communicate information (e.g., state-of-charge, an operating condition, etc.) to a user.

Figure 13:
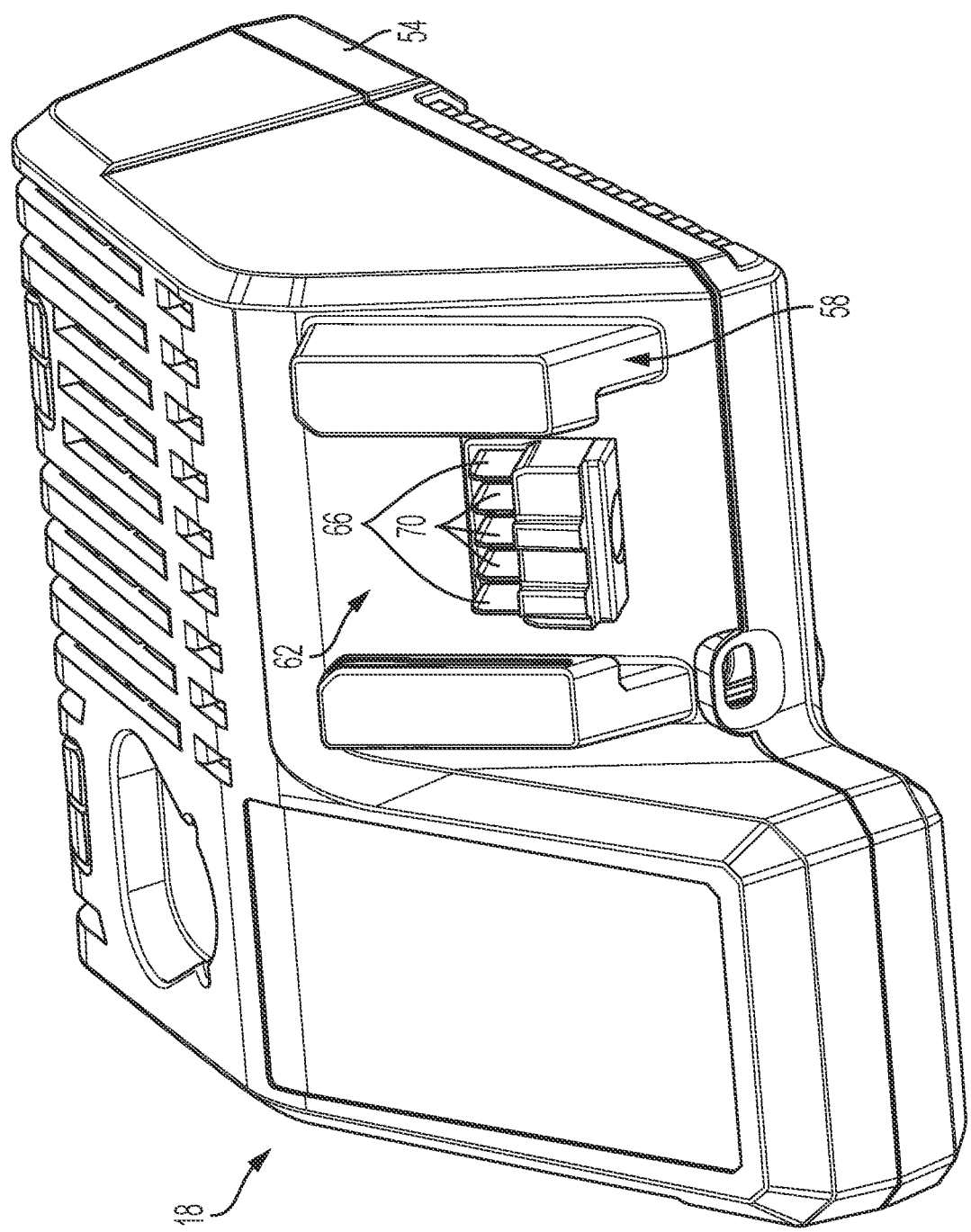
FIG. 13 is a front perspective view of a charger to be used with the heater assembly of FIG. 1 or FIG. 3.
Figure 14:
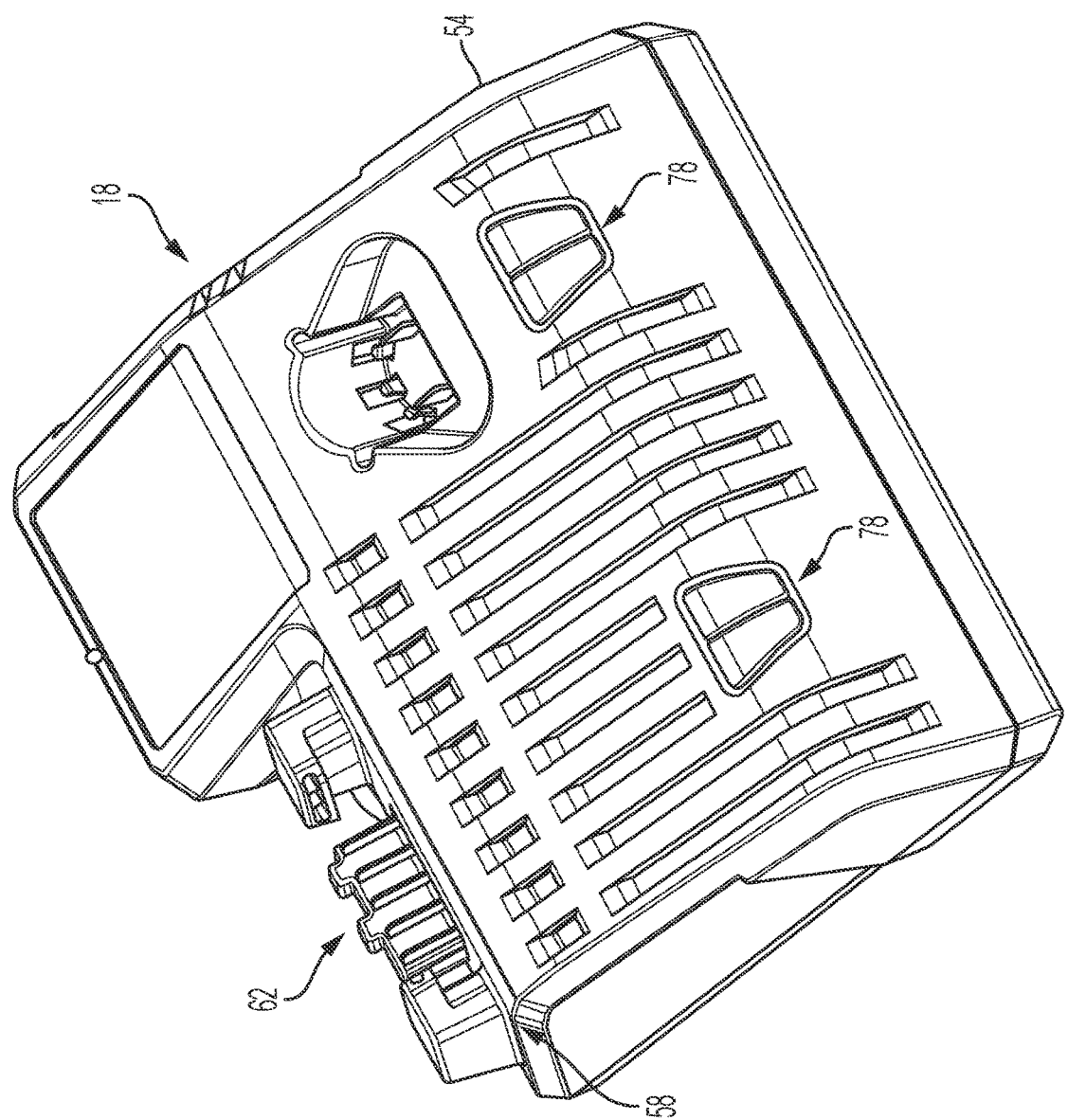
FIG. 14 is a rear perspective view of the charger in FIG. 13.

The charger 18 includes (see FIGS. 13-14) a housing 54 providing a support portion 58 operable to support the battery pack 14 and, as explained below, the heater assembly 10, 10'. In the illustrated embodiment, the support portion 58 is compatible with the battery pack support portion 38 and includes a slide-on interface with complementary rails and grooves.

A charger terminal block 62 is electrically connectable to the battery pack terminal block 42 to supply power to charge the battery cells 26. The terminal block 62 includes male power terminals 66 electrically connectable to the battery pack power terminals 46 to facilitate power transfer. The terminal block 62 includes one or more male communication terminals 70 operable to communicate with the associated battery pack communication terminal(s) 50.

To connect to the charger 18, the battery pack 14 slides onto the charger 18 along the axis A. As the battery pack 14 is connected, the rails and grooves of the support portions 38, 58 engage. Likewise, the terminal blocks 42, 62 engage along the axis A to provide power transfer and communication.

The battery charger 18 also includes a charging circuit (not shown) operable to provide power from a power source (e.g., an external AC power source, a DC power source, etc.) through a cord (not shown) to charge the battery cells 26. The battery charger 18 includes a charger controller (not shown) operable to, for example, communicate information with the battery pack 14, control charging of the battery pack 14, etc. The charger 18 includes an indicator 78 (e.g., one or more LEDs) operable to communicate information (e.g., state-of-charge, an operating condition, etc.) to a user.

As mentioned above, the heater assembly 10, 10' is mechanically and electrically connected between the battery pack 14 and the charger 18 and is operable to heat the battery pack 14. When the temperature of the battery pack 14 is acceptable (e.g., exceeds a temperature threshold for charging), the illustrated heater assembly 10, 10' is operable to supply power to charge the battery pack 14.

The heater assembly 10 includes an adapter portion 82 connectable between the battery pack 14 and charger 18. The adapter portion 82 includes a housing 86 providing a first support portion 90 connectable to the charger support portion 58 and a second support portion 94 connectable to the battery pack support portion 38. The adapter support portions 90, 94 are compatible with the support portions 38, 58 and include slide-on interfaces with complementary rails and grooves. An adapter latch assembly 96 is provided to releasably connect the adapter portion 82 to the charger housing 54.

The adapter portion 82 also includes a first terminal block 98 connectable to the charger terminal block 62 and a second terminal block 102 connectable to the battery pack terminal block 42. The adapter terminal blocks 98, 102 include adapter power terminals 106 (male power terminals 106 shown on the terminal block 102; female power terminals [not shown] being on the terminal block 98) electrically connectable to the associated charger or battery pack power terminals 66, 46 to facilitate power transfer. The adapter terminal blocks 98, 102 also include one or more communication terminals 110 (male communication terminals 106 shown on the terminal block 102; female communication terminals [not shown] being on the terminal block 98) operable to communicate with the associated charger or battery pack communication terminal(s) 70, 50.

To connect the adapter portion 82 to the charger 18, the adapter portion 82 slides onto the charger 18 along the axis A. As the adapter portion 82 is connected, the rails and grooves of the support portions 58, 90 engage. Likewise, the terminal blocks 62, 98 engage along the axis A to provide power transfer and communication. When connected, the adapter latch assembly 96 engages to releasably connect the adapter portion 82 and the charger 18.

Similarly, to connect the battery pack 14 to the adapter portion 82, the battery pack 14 slides onto the adapter portion 82 along the axis A. As the battery pack 14 is connected, the rails and grooves of the support portions 38, 94 engage. Likewise, the terminal blocks 42, 102 engage along the axis A to provide power transfer and communication. When connected, the battery pack latch assembly 40 may engage to releasably connect the battery pack 14 and the adapter portion 82.

The heater assembly 10 also includes an inductive coil portion 114 supported by the adapter portion 82. The coil portion 114 includes a coil housing 118 supporting one or more inductive coil windings 122 (see FIG. 2). The coil portion 114 is constructed to define a receptacle 126 for the battery pack 14 with the coil windings 122 arranged to generate an inductive field in the battery pack 14. It should be understood that the receptacle 126 may be constructed/sized based upon the shape/size of the battery pack(s) 14 to be heated.

In the battery pack 14, the battery cells 26 generally extend transverse to the axis A between the sides of the housing 22. In the embodiment shown in FIGS. 1-2, the coil windings 122 are arranged to wind along opposite sides of the battery pack 14 and along the opposite ends of the battery cells 26. In the embodiment shown in FIGS. 3-10, the coil windings 122' are arranged to wind about the opposite sides and opposite ends of the battery pack 14 and along the opposite ends and the sides of the battery cells 26. It should be understood that, in other embodiments (not shown), the coil windings 122, 122' may have a different configuration, such as, for example, clamshell, pancake, etc.

The heater assembly 10 includes (see FIG. 17) a circuit 130 connectable between a power source (e.g., the charger 18) and the coil windings 122 to cause the coil windings 122 to generate an inductive field to heat the battery pack 14 (e.g., the battery cells 26). In the embodiment shown in FIGS. 1-2, the adapter housing 86 and the coil housing 118 are formed as a single housing, and the coil windings 122 are electrically connected to the circuit 130.

In the embodiment shown in FIGS. 3-10, the adapter housing 86' and the coil housing 118' are separate and, as illustrated, relatively movable. The illustrated heater assembly 10' includes structure to mechanically and electrically connect the adapter portion 82' and the coil portion 114' while accommodating relative movement.

As described above, the battery pack 14 is connected to the adapter portion 82' by sliding along axis A. In the embodiment of FIGS. 3-10, an end portion of the coil housing 118' and the coil windings 122' block the axis A. Accordingly, the coil portion 114' is movable (e.g., pivotable) relative to the adapter portion 82' to expose the adapter support portion 94' for connection to the battery pack 14.

The heater assembly 10' includes a pivot connection 134 between the adapter portion 82' and the coil portion 114' so that the coil portion 114' is pivotable between an open position (see FIGS. 3-4), in which the adapter support portion 94' (FIG. 12) is exposed and the battery pack 14 may be slidingly installed/removed, and a closed position (see FIGS. 5-6), in which the battery pack 14 cannot be installed/ removed. The pivot connection 134 also provides an electrical connection between the circuit 130 and the coil windings 122'

A handle portion 138 is provided on the coil portion 114' for engagement by a user to move the coil portion 114' between the open and closed positions. A first stop assembly 142 is provided to limit movement of the coil portion 114' relative to the adapter portion 82' in the opening direction. A second stop assembly 146 is provided to limit movement of the coil portion 114' relative to the adapter portion 82' in the closing direction. The coil housing 118' and the adapter housing 86' include inter-engaging surfaces which engage in the open position and in the closed position to prevent further movement in the opening direction and in the closing direction, respectively.

The heater assembly 10' may include a latch assembly (not shown) operable to releasably retain the coil portion 114' in the closed position and/or in the open position. The heater assembly 10' may also include a sensor assembly (not shown; e.g., a switch) operable to sense a position of the coil portion 114' (e.g., the closed positon). The heater assembly 10' may be inhibited from operating to heat the battery pack 14 if the coil portion 114' is not in the closed position.

In the closed position (see FIGS. 5-6), the illustrated coil portion 114' encompasses the battery pack 14 on four sides. The four-sided coil winding enclosure induces eddy currents along four sides of the battery pack 14/battery cells 26, thereby substantially uniformly heating the battery pack 14.

Figure 5:
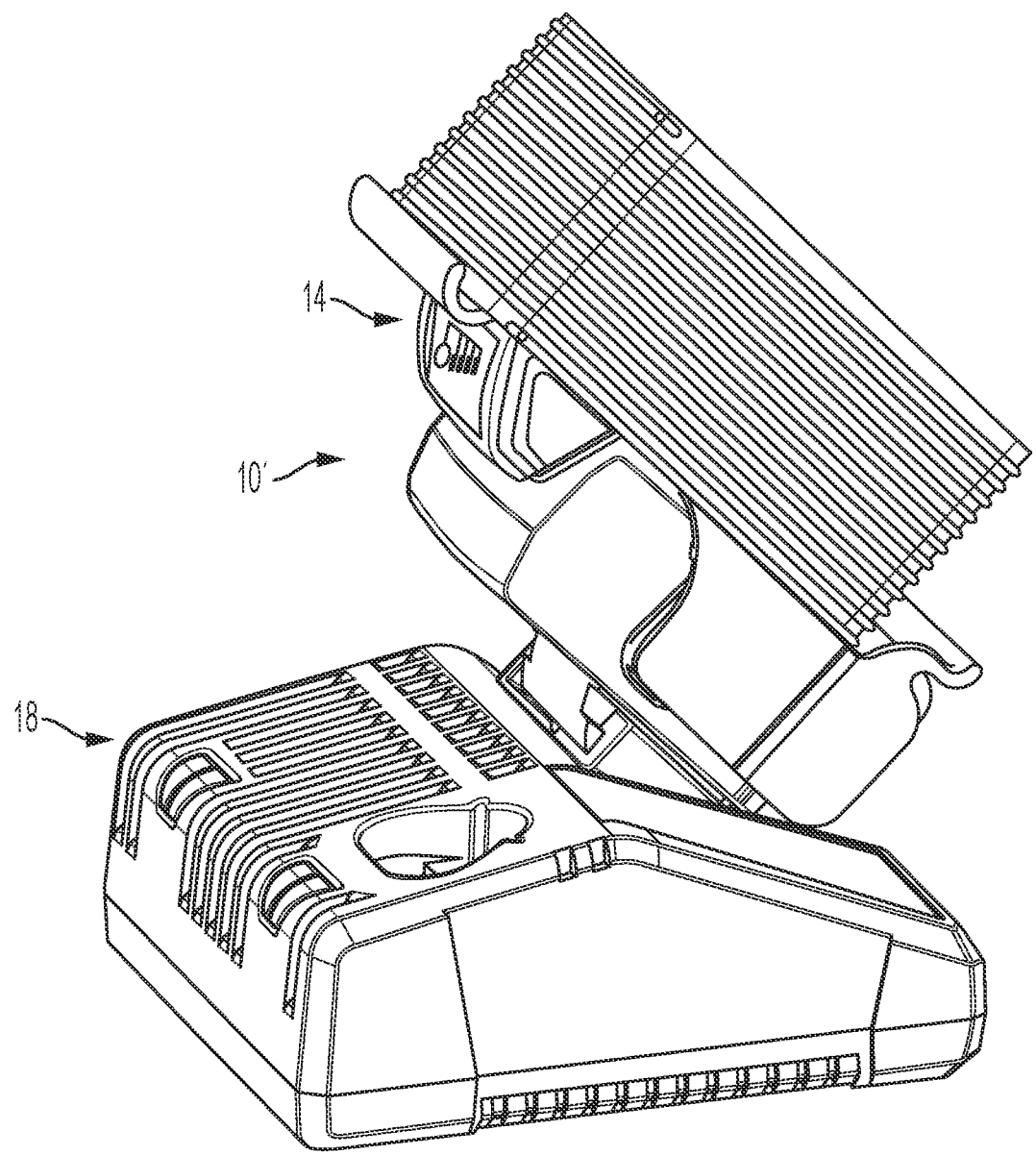
FIG. 5 is a front perspective view of the heater assembly of FIG. 3 with the coil portion illustrated in a closed position.
Figure 6:
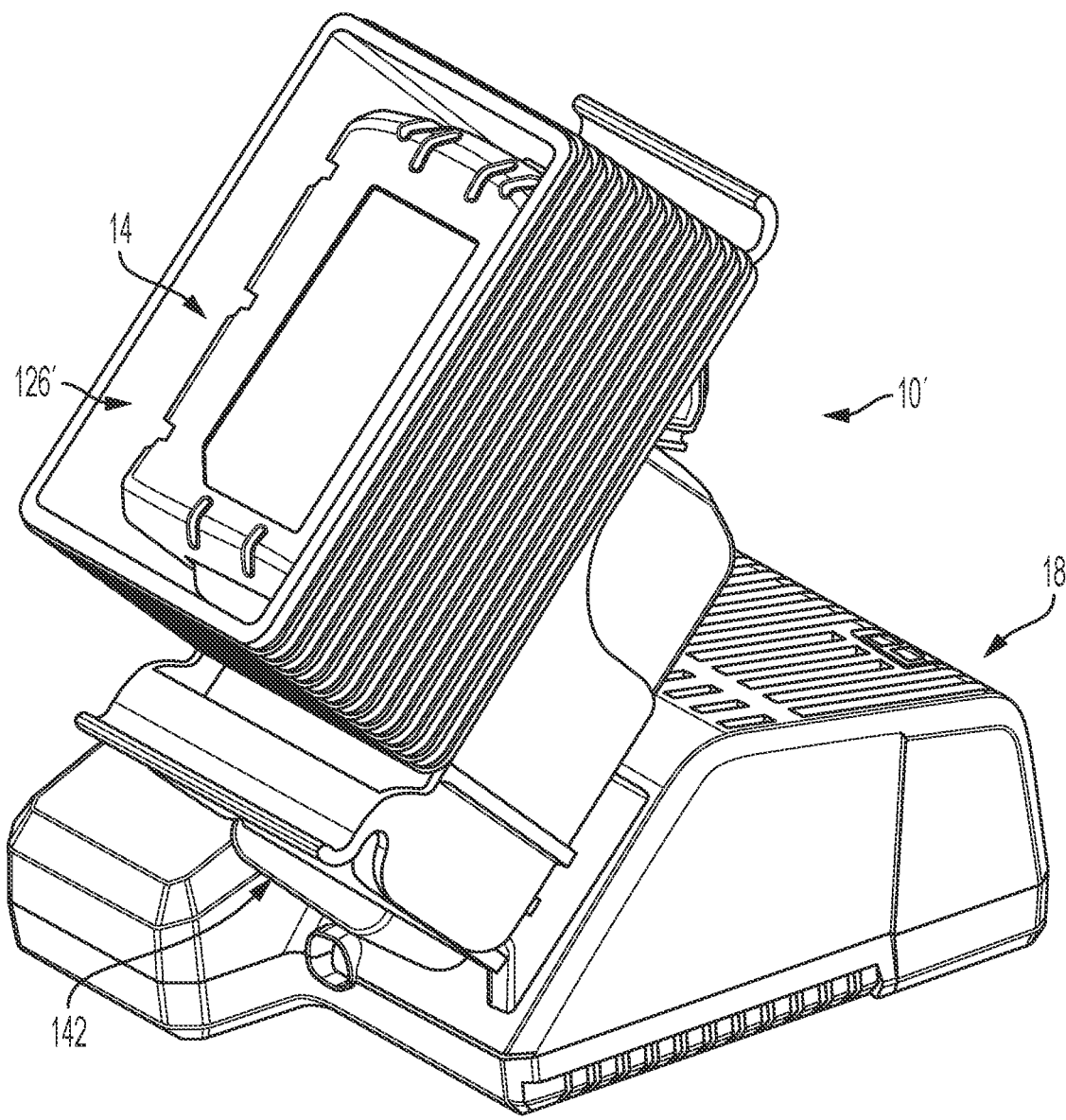
FIG. 6 is a rear perspective view of the heater assembly of FIG. 3 with the coil portion illustrated in the closed position.
Figure 7:
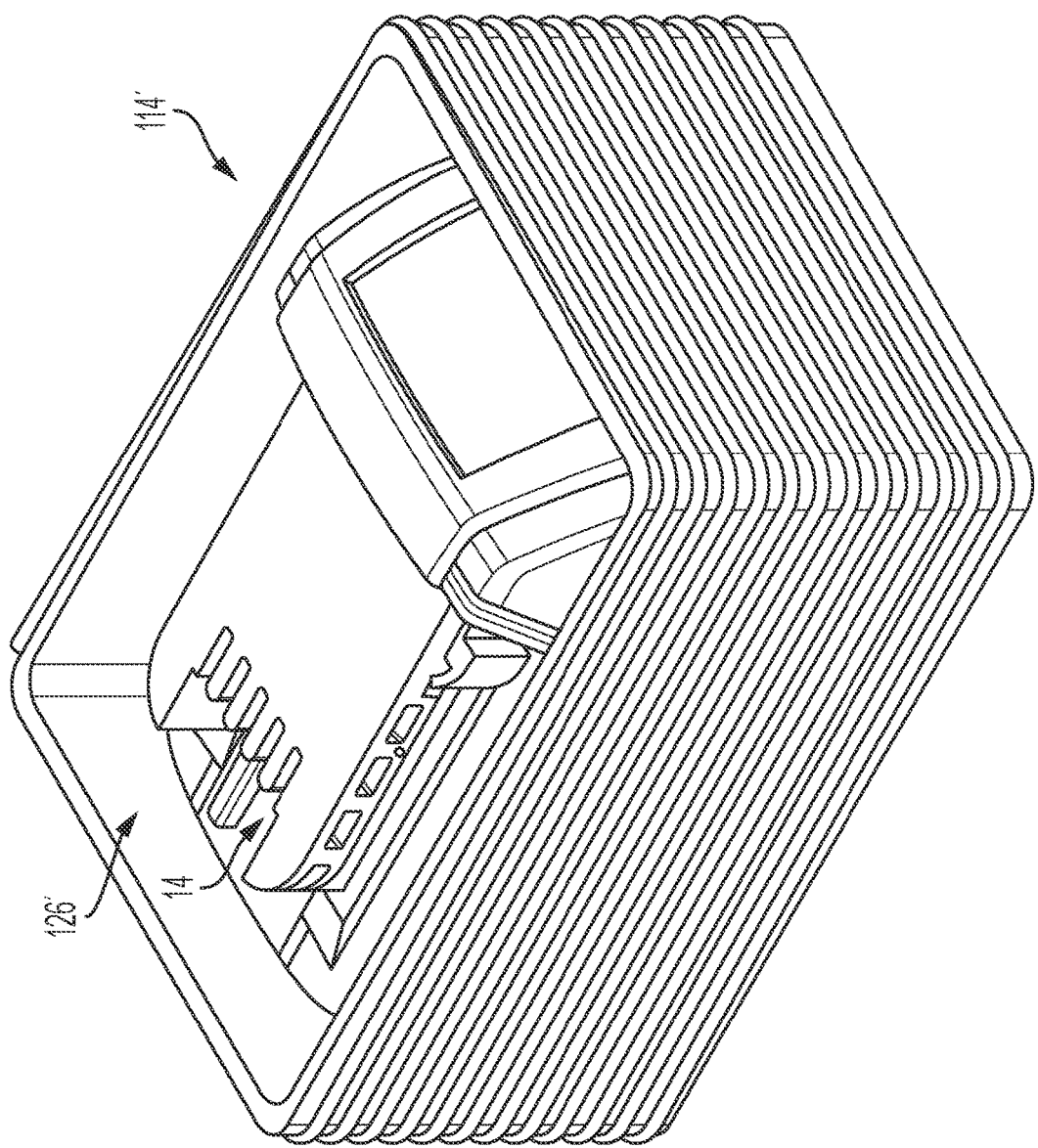
FIG. 7 is a bottom perspective view of a coil portion of the heater assembly of FIG. 3 around a battery pack.
Figure 8:
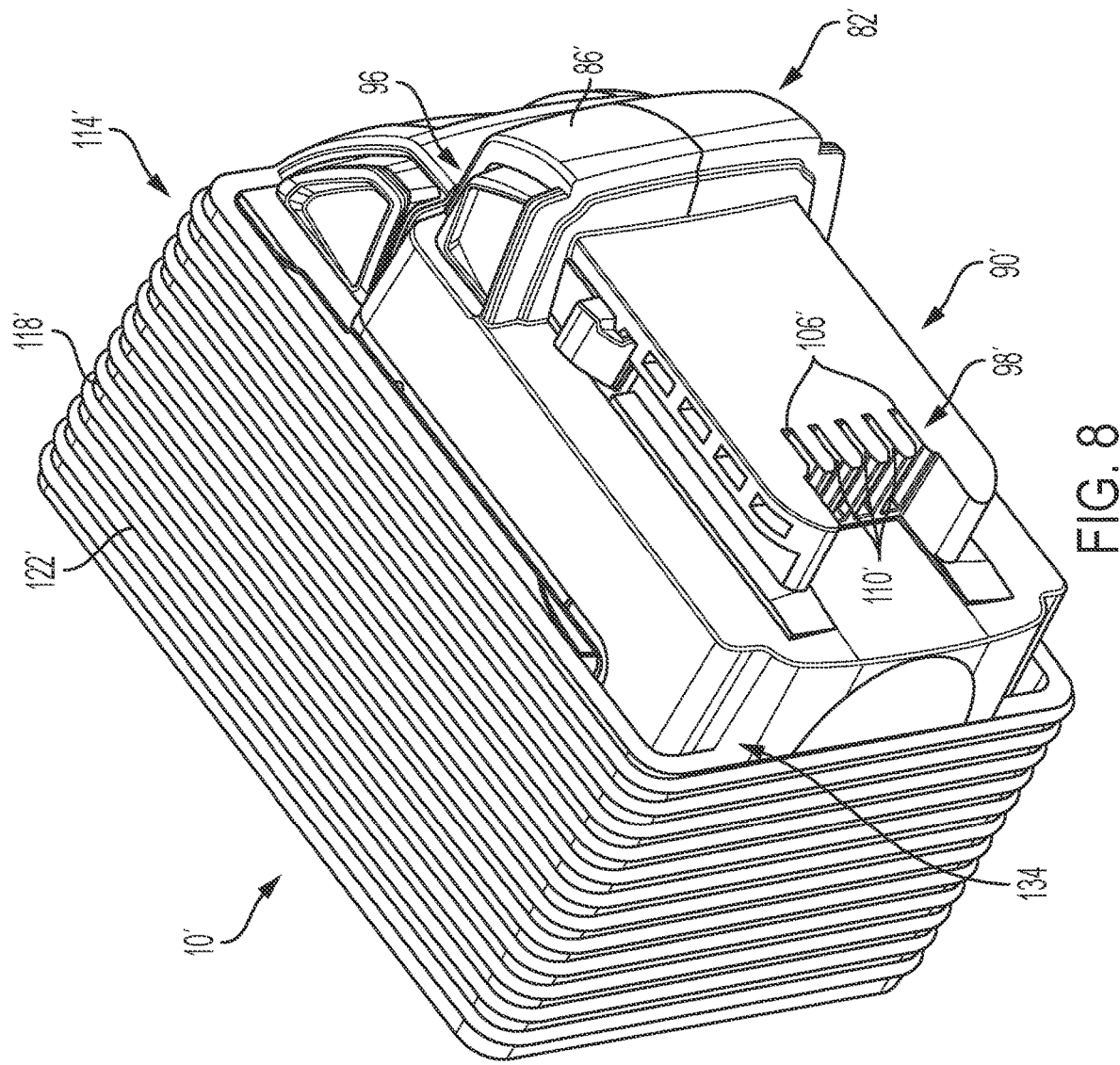
FIG. 8 is a bottom perspective view of the heater assembly of FIG. 3.
Figure 9:
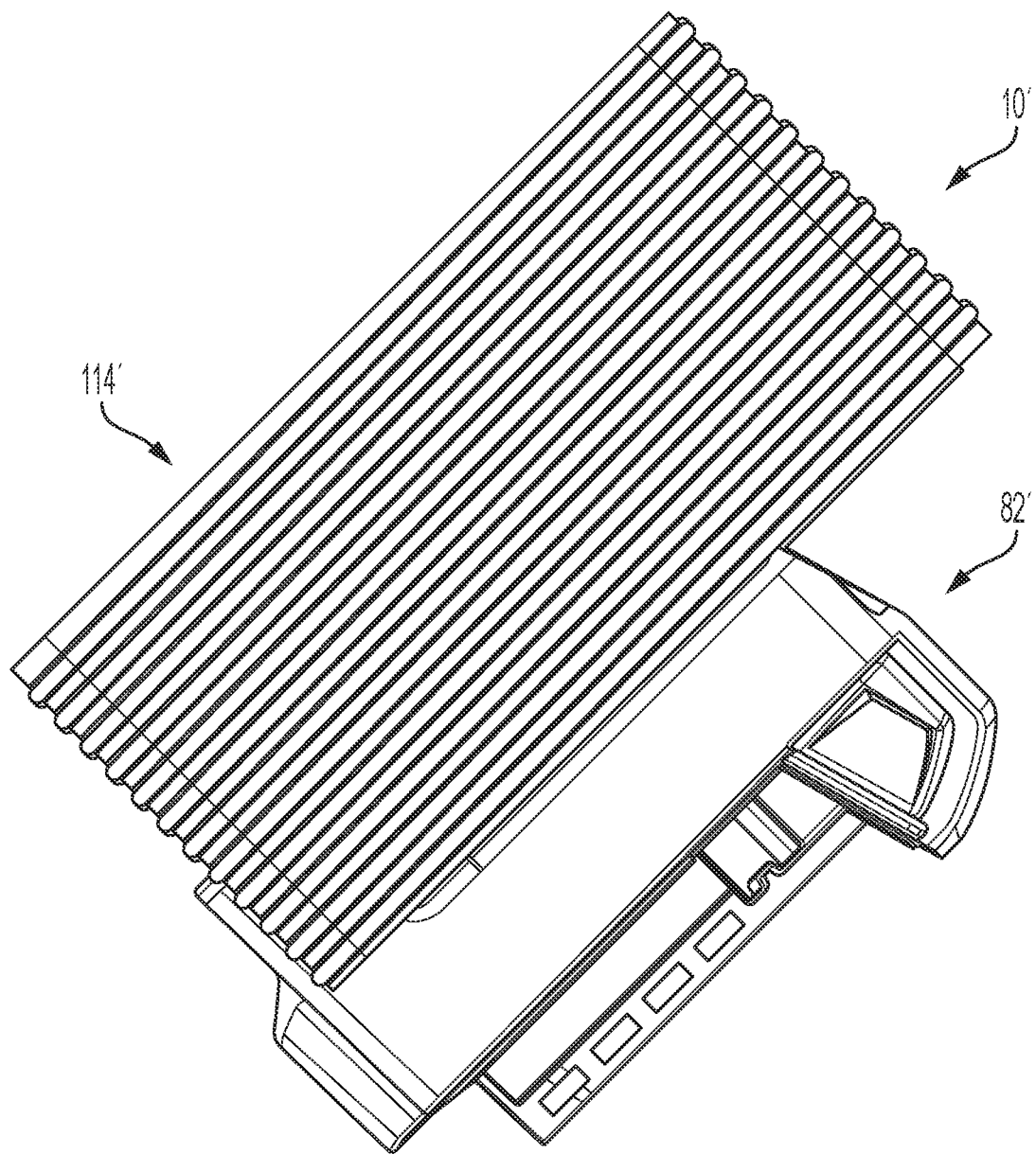
FIG. 9 is a side view of the heater assembly of FIG. 3.
Figure 10:
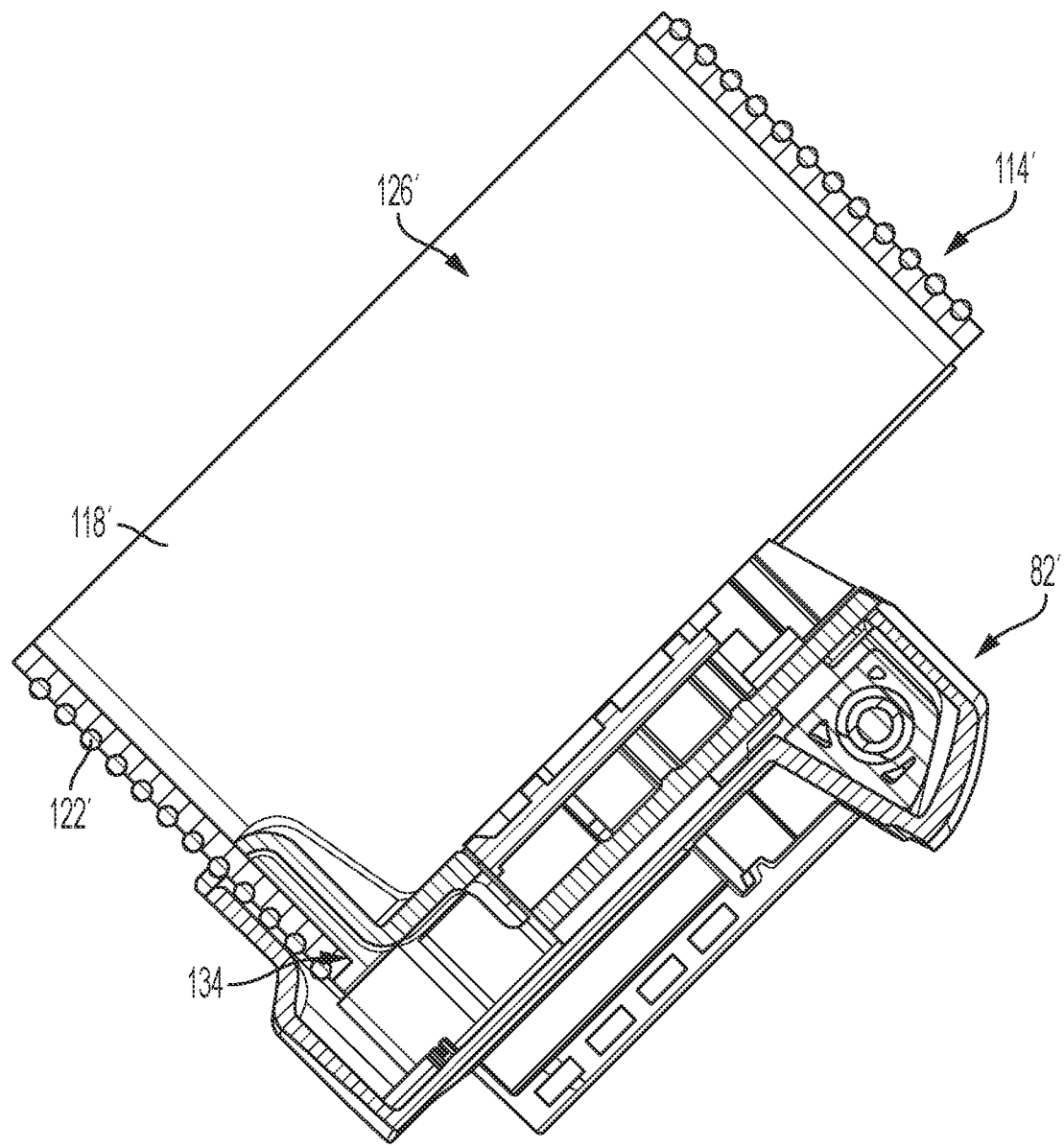
FIG. 10 is a cross-sectional view of the heater assembly of FIG. 3.
Figure 11:
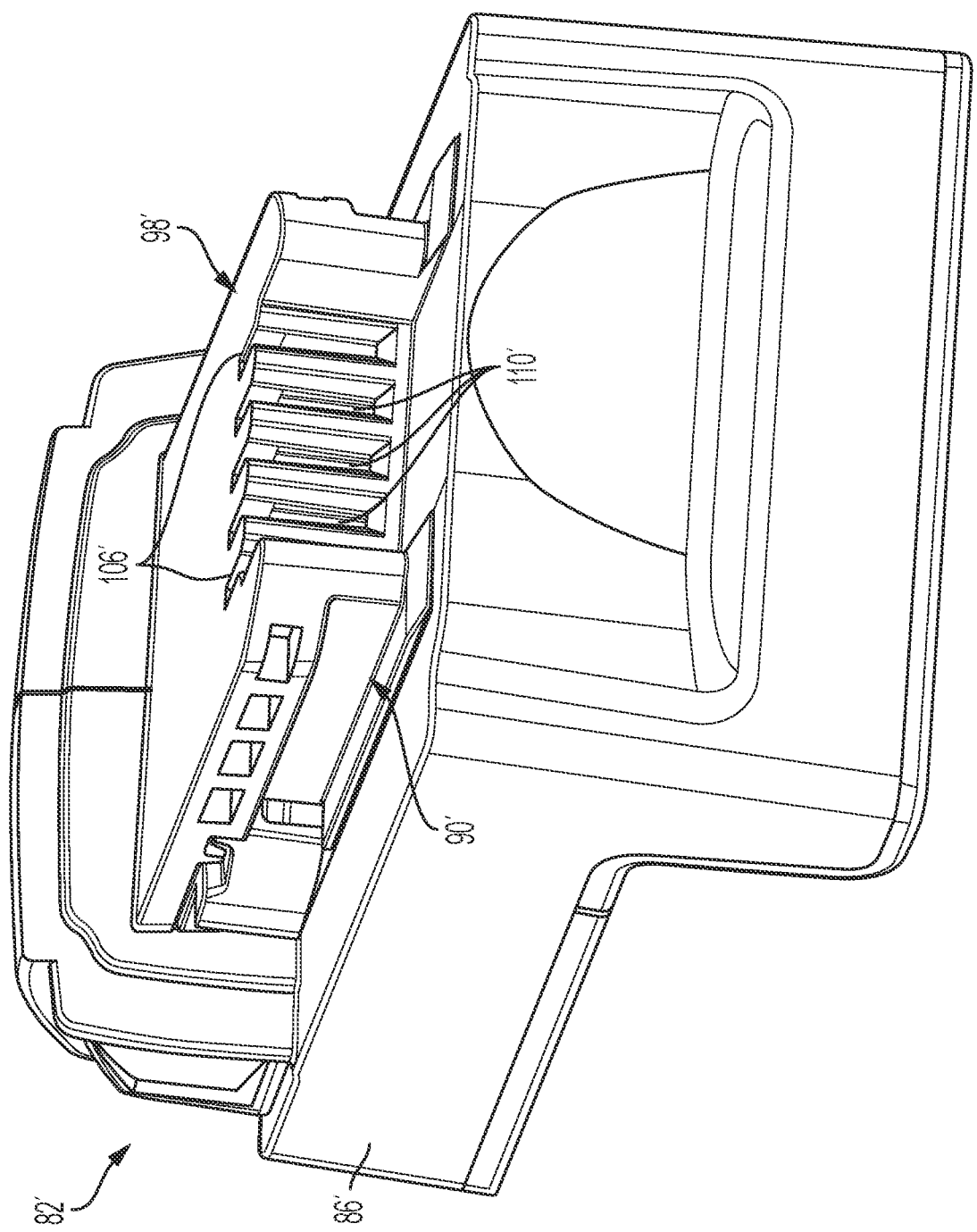
FIG. 11 is a bottom perspective view of an adapter portion of the heater assembly of FIG. 8.
Figure 12:
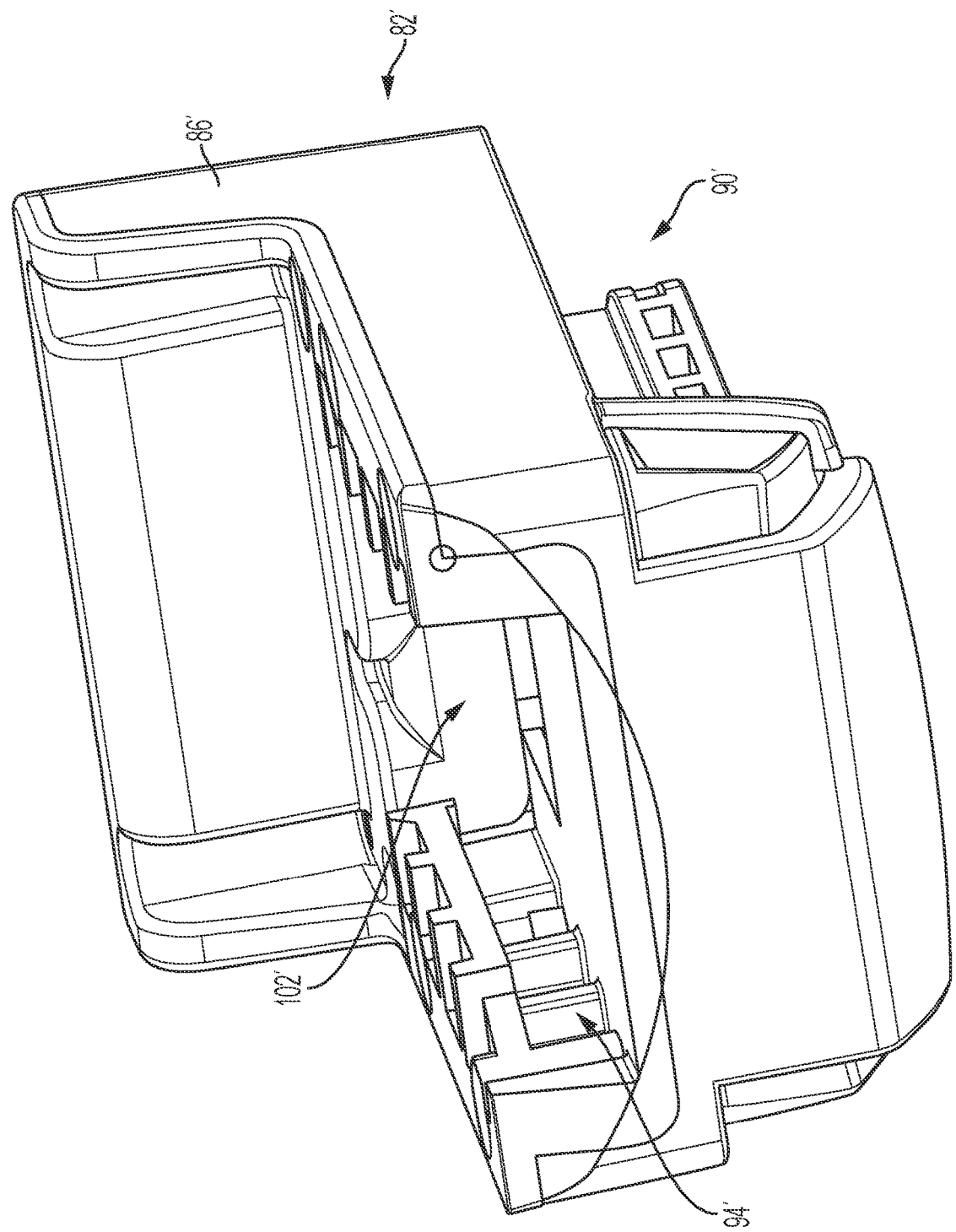
FIG. 12 is a top perspective view of the adapter portion of FIG. 11.

As shown in FIGS. 5-6, in the closed position, the adapter portion 82' substantially covers the lower side of the battery pack 14 (the top of the battery pack 14). The illustrated coil portion 114' has an open top such that the upper side of the battery pack 14 (the bottom of the battery pack 14) is exposed to ambient environment. In other embodiments (not shown), the coil portion 114' may be constructed with a closed top so that the battery pack 14 is covered on the upper surface. Also, the coil portion 114' and the adapter portion 82' may be constructed to more fully enclose and/or seal the battery pack 14 in the closed position to limit/prevent exposure to the ambient environment.

The heater assembly 10, 10' also includes a heater controller (not shown) operable to, for example, communicate information, control supply of power to the coil windings 122, 122' to control heating of the battery pack 14, control supply of power from the charger 18 to the battery pack 14 for charging, etc. The heater controller receives/sends information from/to the battery pack 14 and from/to the charger 18 over the associated communication terminals 50, 70, 110. The heater assembly 10, 10' includes an indicator (not shown; e.g., one or more LEDs) operable to communicate information (e.g., an operating condition, etc.) to a user.

Figure 17:
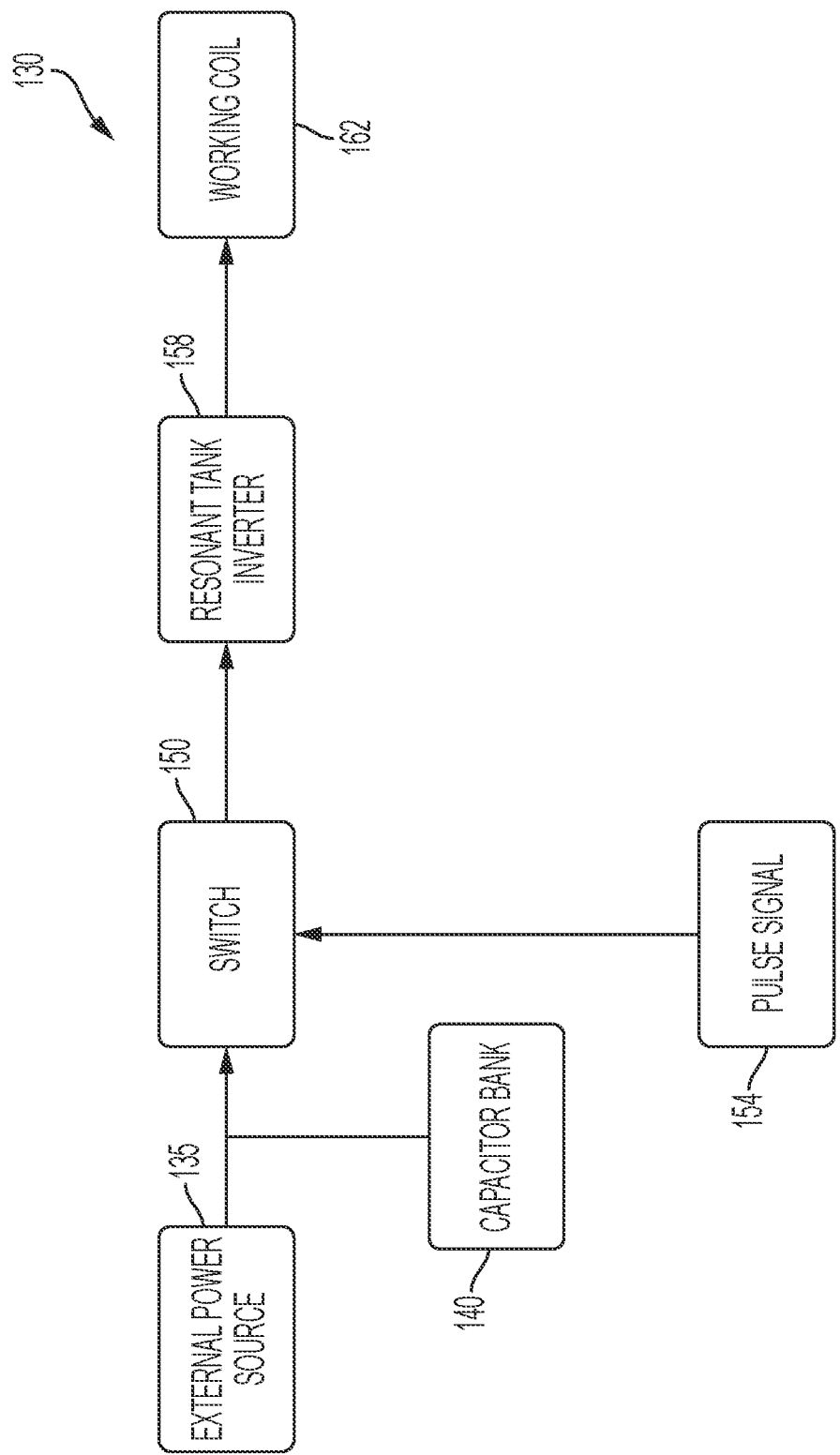
FIG. 17 is a block diagram of a circuit of the heater assembly of FIG. 1 or FIG. 3.

FIG. 17 shows a block diagram of the circuit 130 of the heater assembly 10, 10'. Power from an external power source 135 (e.g., the charger 18) is supplied to charge a capacitor bank 140. External power is also supplied to a switch 150 configured to switch on and off based on a pulse signal 154. When the pulse signal 154 pulses to "high," the switch 150 turns to the on state and external power from the external power source 135 is delivered to a resonant inverter or resonator circuit 158 and a coil section 162. In other embodiments, the switch 150 may be driven on the inverse of the pulse signal 154 to minimize noise (e.g. the switch 150 turns to the on state when the pulse signal 154 pulses to "low"). The resonant inverter 158 is configured as a half bridge inverter including a plurality of circuit elements, such as transistors, diodes, resistors, etc. In some embodiments, the resonant inverter adjusts output power based on input voltage and the output frequency depends on the tuned resonance of an inductive coil and a capacitance. For example, in some embodiments the resonant inverter 158 operates at approximately 70 kHz.

When an external power is supplied through the switch 150, power is delivered to the coil section 162 consisting of a number of individual conductors (not shown). This coil section 162 may be configured as the coil windings 122, 122' and used to inductively heat a battery pack 14.

When the battery pack 14 has reached a predetermined temperature threshold, external power may be delivered through the resonant inverter 158 to charge the battery pack 14. When the pulse signal 154 turns the switch 150 to the off state, all charging and heating of the battery pack 14 ceases.

For use, the heater assembly 10, 10' is connected to the charger 18, as described above. A battery pack 14 to be charged is connected to the heater assembly 10, 10', as described above, and the heater assembly 10, 10' is readied for operation (e.g., the coil portion 114' is moved to the closed position.

Operation of the heater assembly 10, 10' may be controlled and executed by the controller of the battery pack 14, of the charger 18 and/or of the heater assembly 10, 10'. In the illustrated embodiment, the heater controller monitors communication between the battery pack 14 and the charger 18 to determine when heating is appropriate or required. In operation, when a battery pack 14 is connected to the heater assembly 10, 10', the temperature of the battery pack 14 is determined and evaluated against the charging temperature threshold. If the temperature exceeds the threshold, the heater assembly 10, 10' operates to provide power from the charger 18 to the battery pack 14 to charge the battery cells 26. Charging will continue until completion (e.g., full charge of the battery pack 14, removal of the battery pack 14, a fault condition, etc.).

If the temperature of the battery pack 14 is determined to be below or equal to the charging temperature threshold, the heater assembly 10, 10' is operated to inductively heat the battery pack before charging. Current is supplied to the coil winding 122, 122', and the windings 122, 122' generate an eddy current to heat the case 34 of each battery cell 26. During heating, the temperature of the battery pack 14 is monitored periodically. The monitoring period may be set (e.g., 5 minutes) or may change based on the temperature of the battery pack 14 alone or compared to the threshold (e.g., 5 minutes for a low temperature or large difference [15° C. or more]; 1 minutes for a higher temperature or smaller difference [5° C. or less])

When the temperature of the battery pack 14 exceeds the charging temperature threshold, charging may begin as described above. The heater assembly 10, 10' may continue to heat the battery pack 14 until the temperature of the battery pack 14 exceeds the charging temperature threshold by a certain amount (e.g., about 3° C.). The heater assembly 10, 10' may then stop heating the battery pack 14.

During or after charging, the temperature of the battery pack 14 may continue to be monitored. If the temperature does not exceed the charging temperature threshold, charging will be ceased. If there is not a fault condition, the heater assembly 10, 10' will be operated to heat the battery pack 14 until the temperature exceeds the charging temperature threshold, and charging will be reinitiated. The heater assembly 10, 10' may also be operated during charging or after charging if the temperature of the battery pack 14 does not exceed a maintenance temperature threshold above the charging temperature threshold.

The status of the operation of the heater assembly 10, 10' may be indicated through the battery pack indicator 52, the charger indicator 78, and/or the heater indicator. The indicator(s) 52, 78 may have a certain color (e.g., red for heating, yellow for warming, green for no heating necessary, etc.), lighting condition (e.g., blinking for heating, solid for no heating, etc.).

In the heater assembly 10, 10' a high frequency current (e.g., greater than 45 kHz) is provided to the coil windings 122, 122', thereby generating an electromagnetic field that induces eddy currents in the steel case 34 (e.g., a 0.3 mm thick case) of the individual battery cells 26. The high frequency current prevents the generated electromagnetic field from penetrating the steel case 34 of the individual battery cells 26 due to the "skin effect" phenomenon. This phenomenon is the tendency of an alternating electric current (AC) to become distributed over the surface of a conductor. At the surface of the conductor, the AC current density is the largest. As the AC current attempts to penetrate deeper into the conductor, the AC current density will rapidly decrease.

This effect is modeled by the following equation:

$$\delta = \sqrt{\frac{2\rho}{\omega\mu}}$$

where $\delta$ is the skin depth, $\omega$ is the angular frequency of the AC current, $\rho$ is the resistivity of the conductor, and $\mu$ is the permeability constant.

From the equation, it is shown that the higher the frequency $\omega$ of the AC current, the smaller the skin depth $\delta$ achieved, meaning that the interior elements of the battery cell 26 will be not be affected by the induced eddy currents. Thus, the induced eddy currents will effectively raise the temperature of the battery cell 26 without damaging the internal elements or decreasing the performance of the battery cell 26.

FIGS. 18A-18H illustrate an enclosure or housing 200 that includes a lower housing portion 205 and an upper housing portion 210. The enclosure 200 includes, for example, one or more inductive heater assemblies 10, 10' internal to the enclosure 200. In some embodiments, the upper housing portion 210 is pivotable about one or more hinges such that the interior of the enclosure 200 can be accessed without completely removing the upper housing portion 210. The upper housing portion 210 is configured to engage the lower housing portion 205 to create a substantially air and water tight seal. Such a seal between the lower housing portion 205 and the upper housing portion 210 aides in preventing air inside the enclosure 200 from being affected by air outside of the temperature controlled enclosure 200.

The enclosure 200 also includes a power input terminal 215. In some embodiments, the power input terminal 215 is an AC power input terminal. In other embodiments, the power input terminal 215 is a DC power input terminal or includes a battery pack interface for receiving one or more battery packs. The upper housing portion 210 includes an interface 220 that is configured to allow the enclosure 200 to physically engage or mate with one or more additional devices that have complimentary interfaces.

Figure 18A:
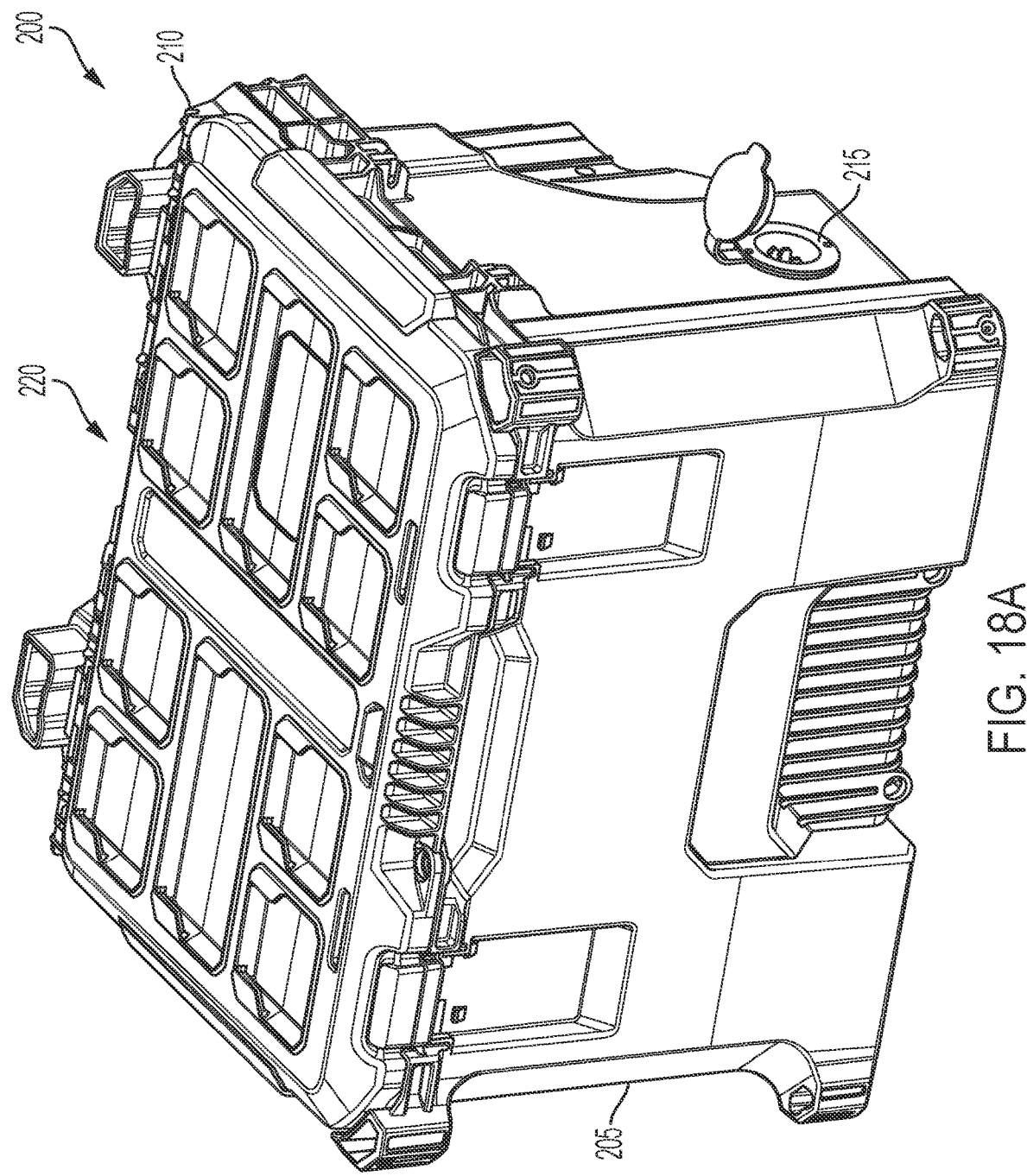
FIGS. 18A, 18B, 18C, 18D, 18E, 18F, 18G, and 18H illustrate an enclosure including the inductive heating system of FIG. 1 or FIG. 3, according to embodiments described herein.
Figure 18B:
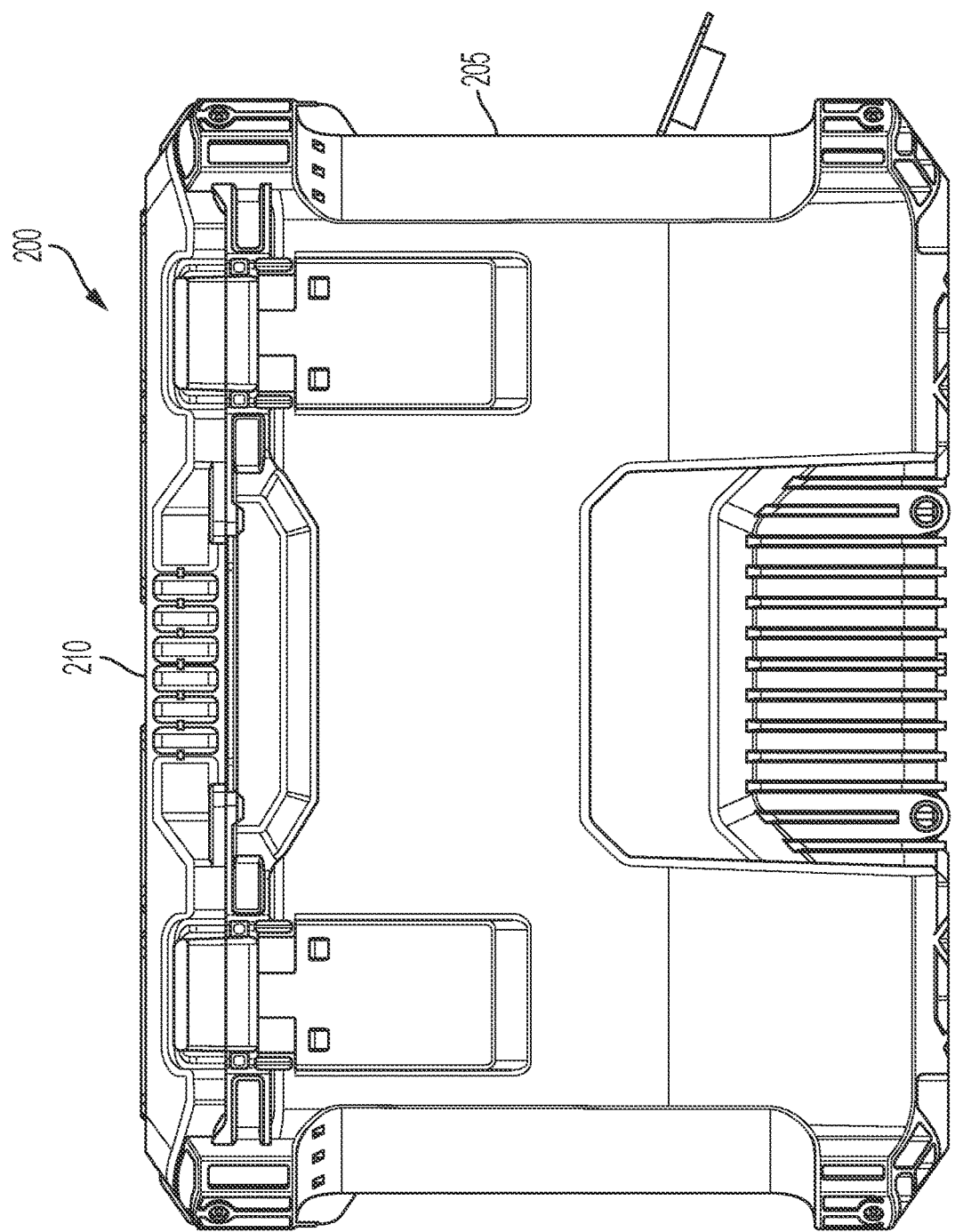
Figure 18C:
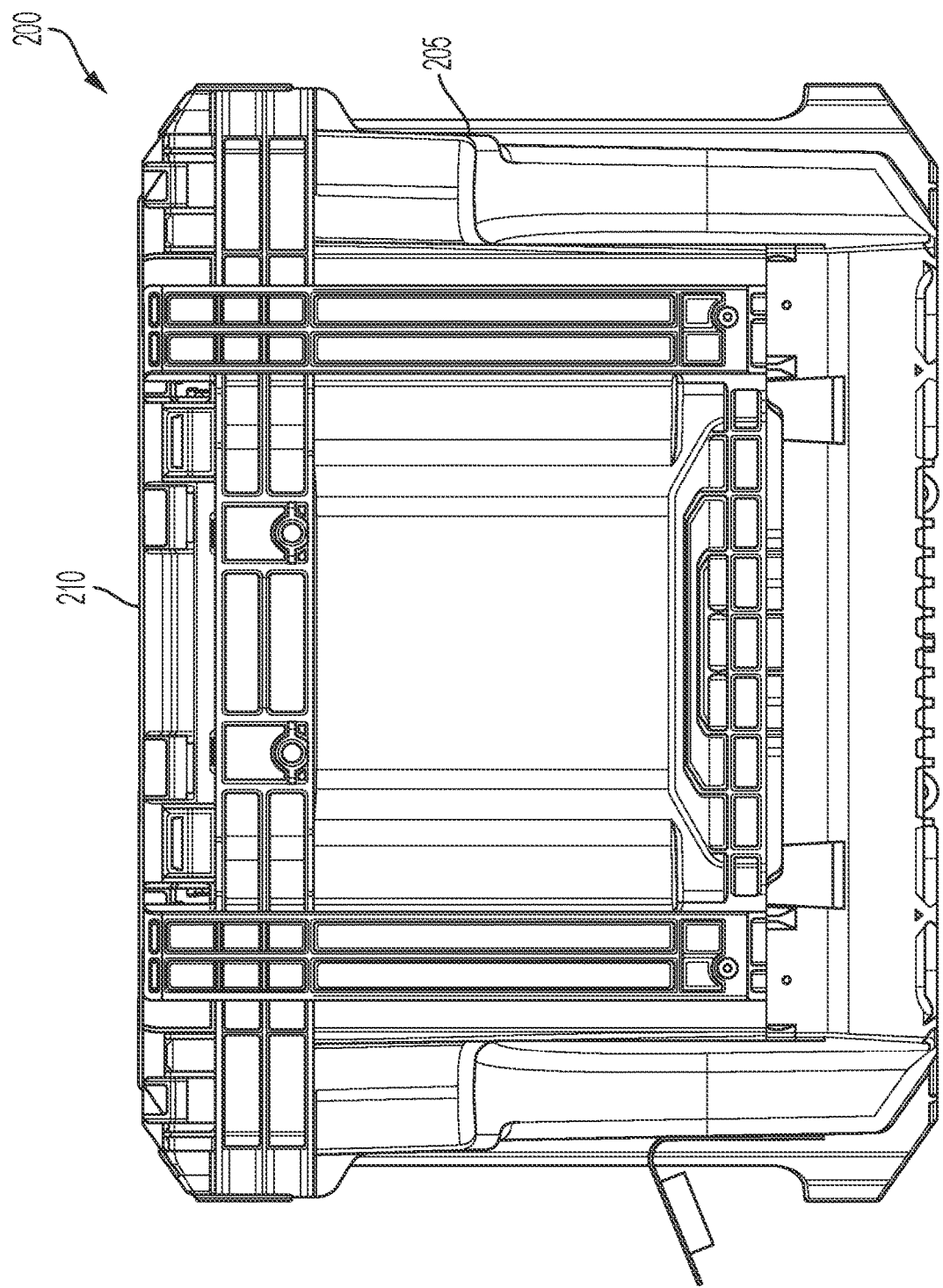
Figure 18D:
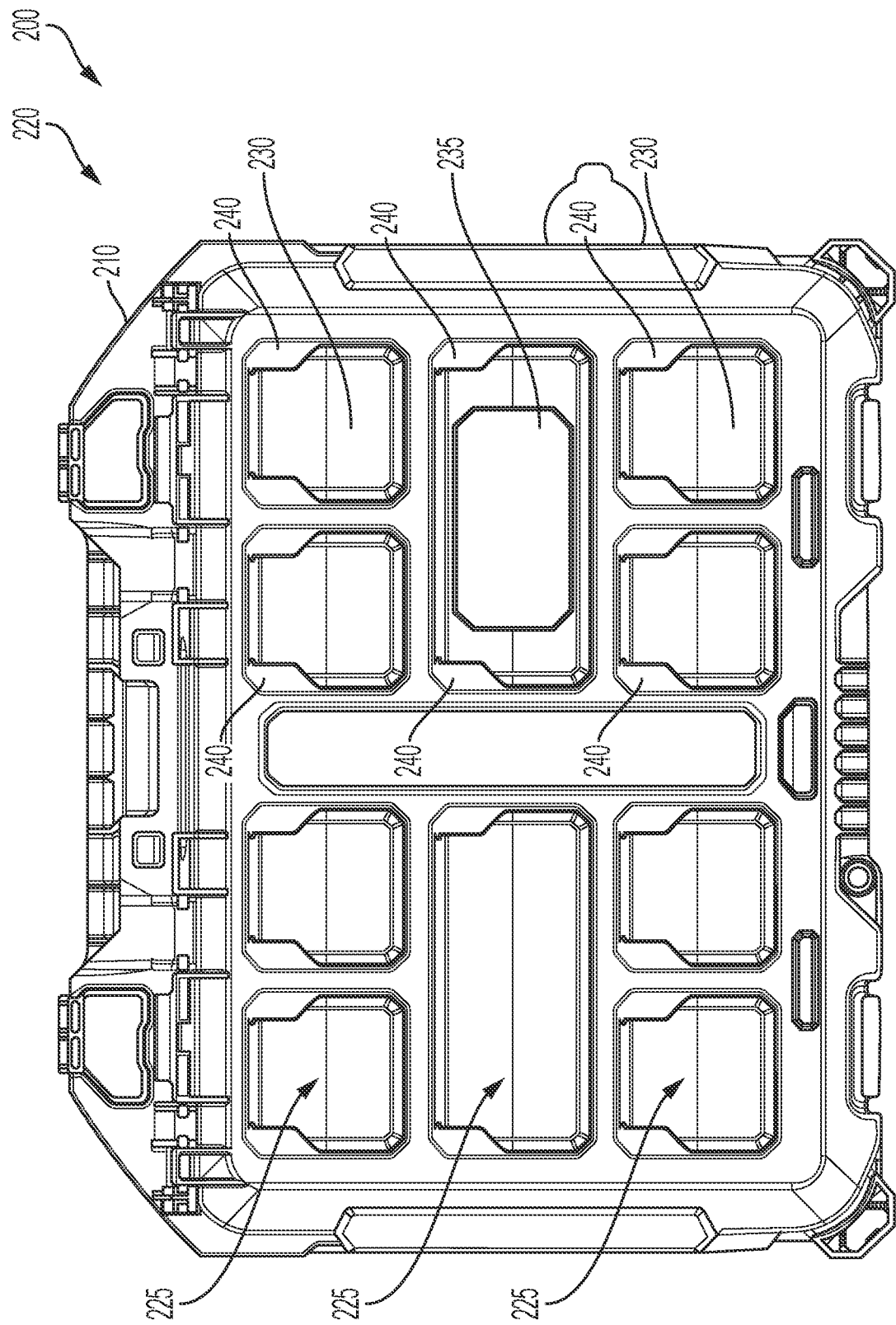
Figure 18E:
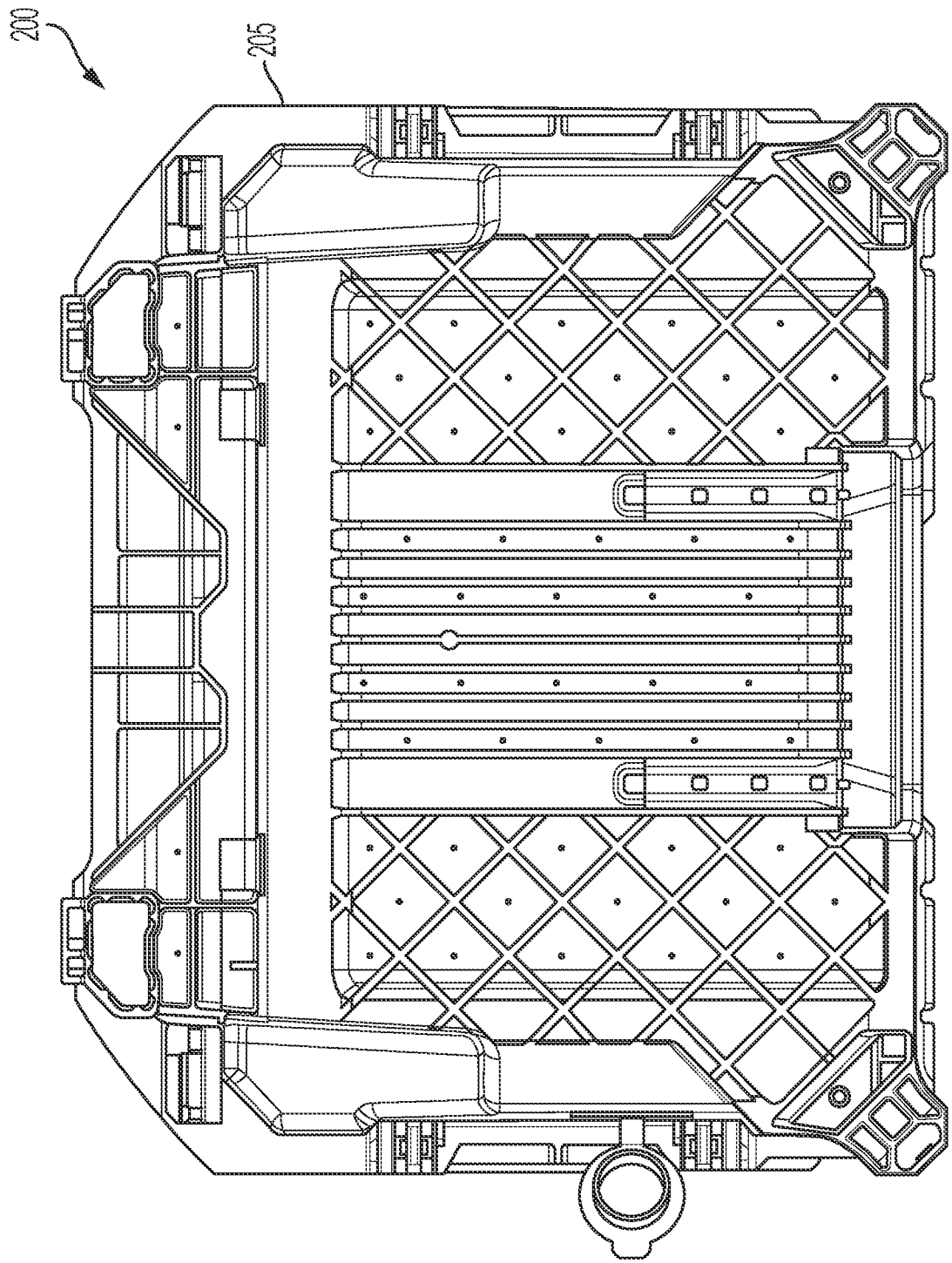
Figure 18F:
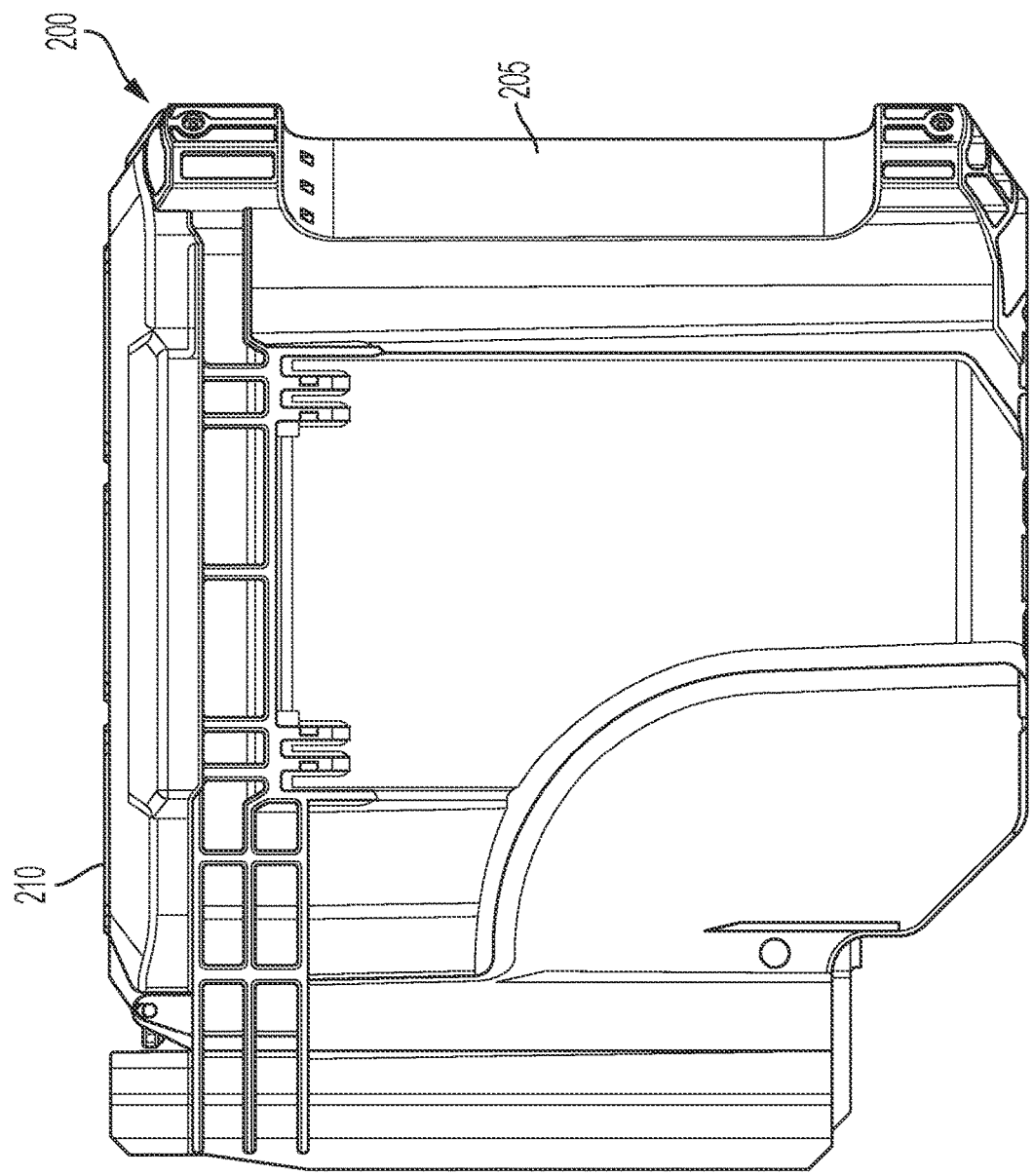
Figure 18G:
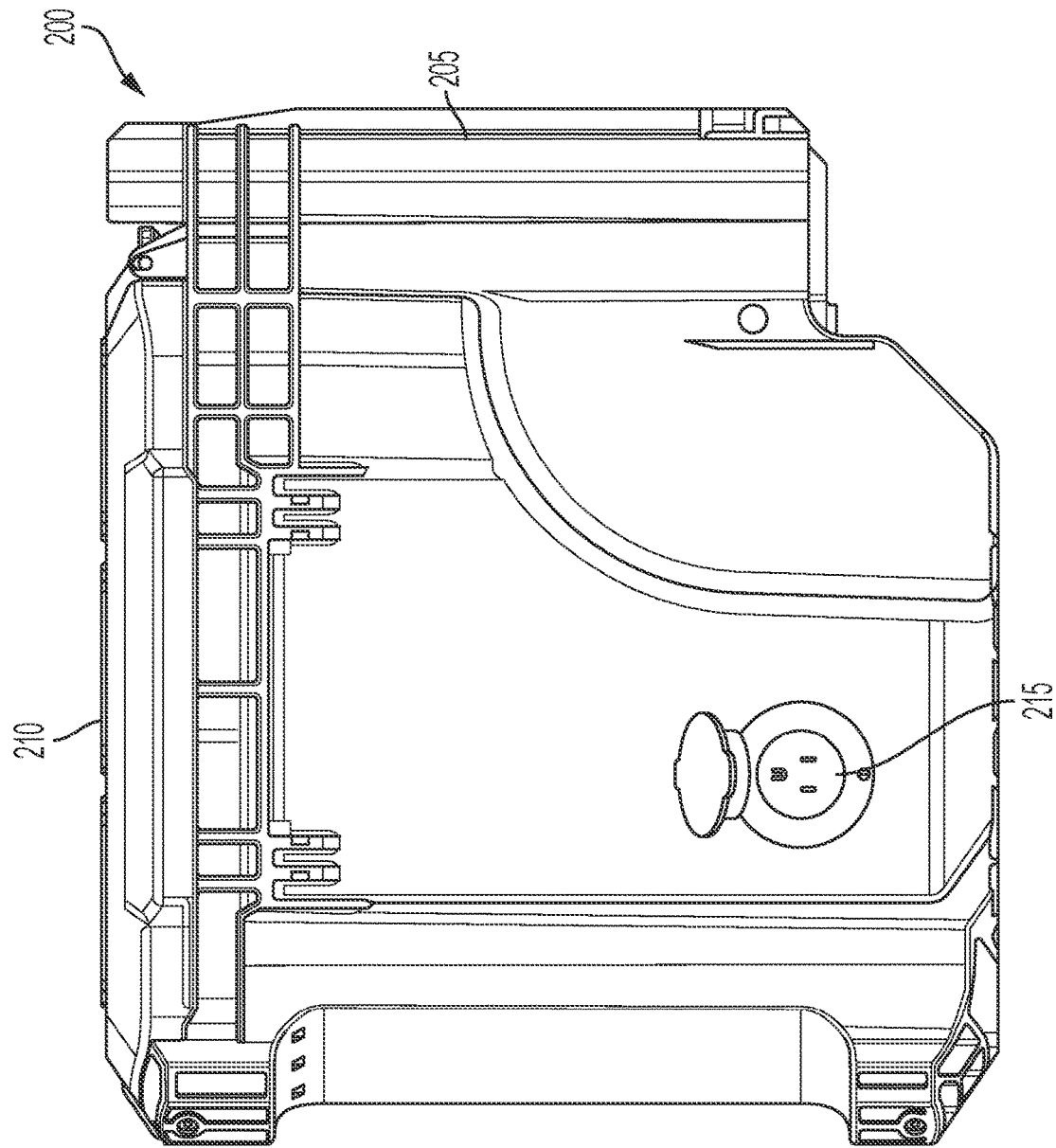

With reference to FIG. 18D, the interface 220 of the upper housing portion 210 includes a plurality of connection recesses 225 that receive and cooperate with projections from a complementary interface. The connection recesses 225 include two rows of two small recesses 230 and one row of large recesses 235. In other embodiments, the upper housing portion 210 can include different numbers or patterns of connection recesses 225. An interface projection or wing 240 extends into each connection recess 225 on opposite sides of the connection recess 225 from one end of the connection recess 225. Each of the wings 240 has a length that extends approximately half the connection recess 225 to define a first portion of the connection recess 225 and a second portion opposite the wings 240, which remains open. In some embodiments, each of the wings 240 has a length that extends less than half the connection recess 225.

Figure 18H:
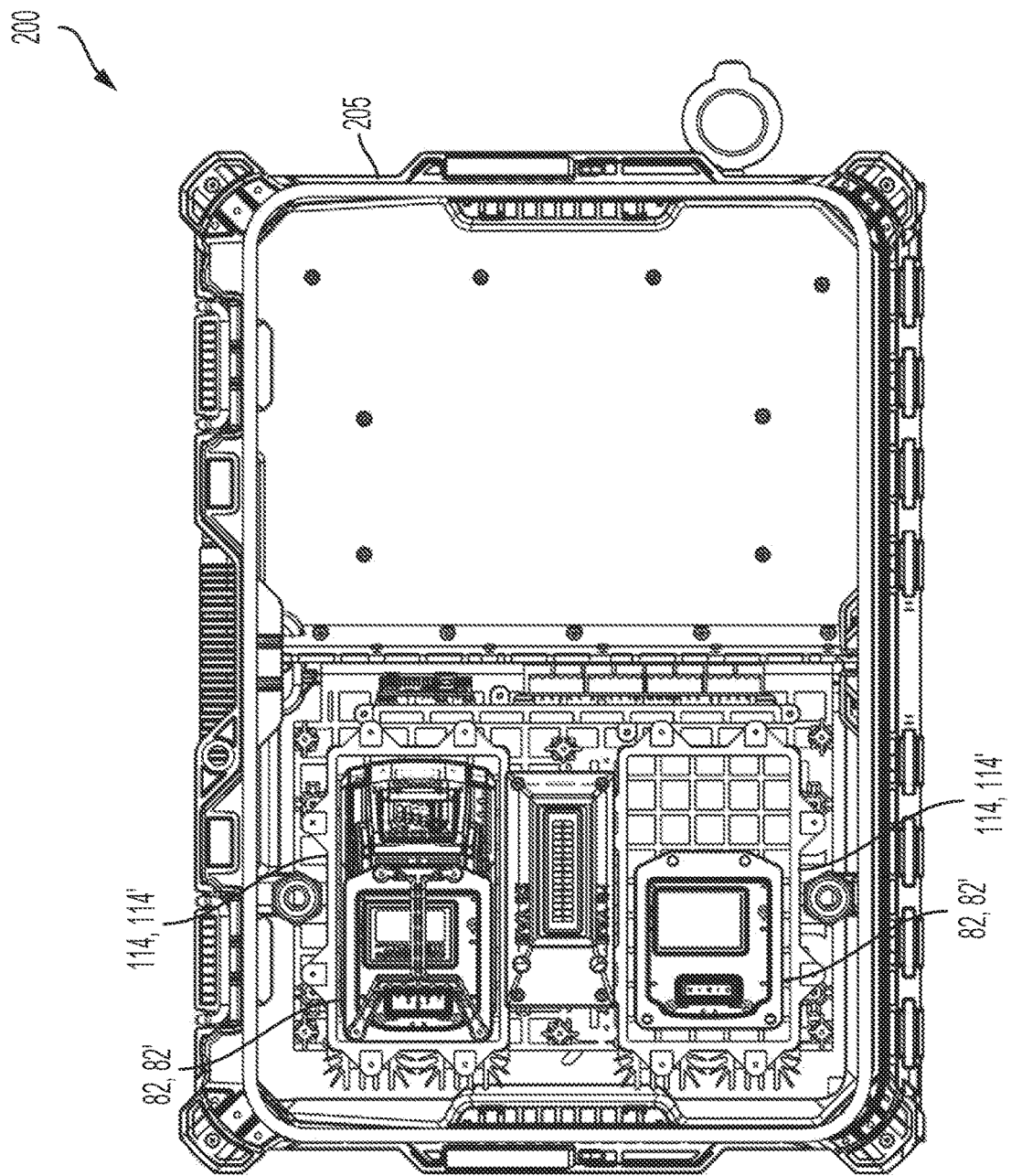

FIG. 18H illustrates the enclosure 200 with the upper housing portion 210 removed. The enclosure 200 includes two coil portions 114, 114' that are each configured to receive a power tool battery pack. FIG. 18H illustrates one of the coil portions 114, 114' with a battery pack inserted within the coil portion 114, 114' and one of the coil portions 114, 114' with no battery pack inserted. In the embodiment illustrated in FIG. 18H, the coil portions 114, 114' are similar to the coil portion 114, 114' and adapter portion 82, 82'. In some embodiments, the adapter portion 82, 82' is integrated with the enclosure 200. As a result, the adapter portion 82, 82' is mechanically and electrically connected to the enclosure 200 and is configured to mechanically and electrically connect to a power tool battery pack. In some embodiments, the adapter portion 82, 82' and coil portion 114, 114' are permanently affixed to the enclosure 200. In other embodiments, the adapter portion 82, 82' and the coil portion 114, 114' are removably affixed to the enclosure 200. In the embodiment of FIG. 18H, the adapter portion 82, 82' is pivotable relative to the coil portion 114, 114' between an open position and a closed position for receiving a power tool battery pack.

Figure 19:
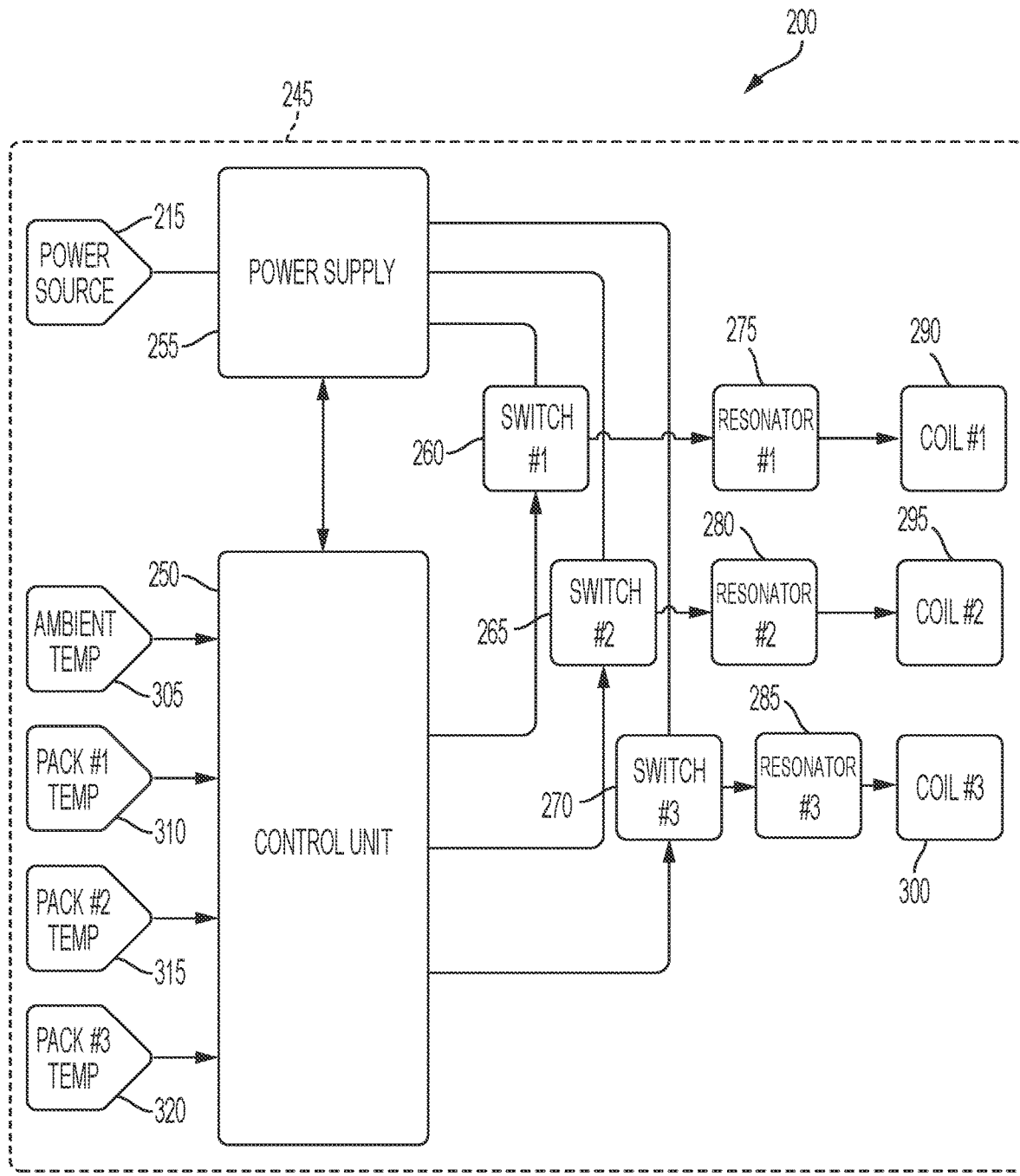
FIG. 19 is an electrical schematic diagram for the enclosure of FIGS. 18A-18H, according to embodiments described herein.

FIG. 19 illustrates an exemplary electrical circuit 245 for the enclosure 200 shown in FIGS. 18A-18H. The circuit 245 includes many similar features to the circuit 130 shown in and described above with respect to FIG. 17. In some embodiments, the enclosure 200 includes one or more of the circuits 130. The circuit 245 for the enclosure 200 is configured to heat one or more battery packs. The circuit 245 includes a control unit 250, a power supply 255, a first switch or relay 260, a second switch or relay 265, a third switch or relay 270, a first resonator circuit 275, a second resonator circuit 280, a third resonator circuit 285, a first heating coil 290, a second heating coil 295, and a third heating coil 300. In some embodiments, the power supply 255 is a 12V, 200 W DC power supply that receives a 120 VAC input voltage. The control unit 250 is configured to receive an input signal 305 from an ambient temperature sensor (e.g., a negative temperature coefficient thermistor), a first temperature signal 310 related to a first battery pack, a second temperature signal 315 related to a second battery pack, and third temperature signal 320 related to a third battery pack. In some embodiments, the first temperature signal 310, the second temperature signal 315, and the third temperature signal 320 are each generated by respective infrared temperature sensors. The infrared temperature sensors can be configured to measure, for example, a temperature of a battery pack's housing. The power supply 255 receives input power from a power source (e.g., power input terminal 215). In some embodiments, a capacitor bank (e.g., capacitor bank 140 in FIG. 17) is connected to the output of the power supply 255. The enclosure 200 is described with respect to FIG. 19 as including three heating coils for heating three battery packs. In other embodiments, the enclosure 200 includes additional heating coils (e.g., 4-10 heating coils) or fewer heating coils (i.e., one or two heating coils) for heating a different number of battery packs.

The control unit 250 is configured to control the first switch 260, the second switch 265, and the third switch 270 to selectively provide power from the power supply 255 to the first resonator circuit 275, the second resonator circuit 280, and the third resonator circuit 285. In some embodiments, the first resonator circuit 275, the second resonator circuit 280, and the third resonator circuit 285 are configured to operate in the same manner as the resonant inverter 158 shown in and described with respect to FIG. 17. In some embodiments, a capacitor bank is connected between each of the switches 260, 265, 270 and the resonator circuits 275, 280, 285. The outputs of the first resonator circuit 275, the second resonator circuit 280, and the third resonator circuit 285 are provided to the first heating coil 290, the second heating coil 295, and the third heating coil 300, respectively, to induce eddy currents in the steel cases of the battery cells of the first, second, and third battery packs.

In some embodiments, the control unit 250 is configured to control the first switch 260, the second switch 265, and the third switch 270 based on one or more of the received temperature signals. For example, control unit 250 is configured to use the input signal 305 related to ambient temperature to determine whether one or more of the switches 260, 265, 270 should be closed. In some embodiments, if an ambient temperature (e.g., internal to the enclosure 200 and/or external to the enclosure 200) is greater than or equal to a temperature threshold value, the control unit 250 prevents the switches 260, 265, and 270 from closing. Similarly, the control unit 250 is configured to use the first temperature signal 310, the second temperature signal 315, and the third temperature signal 320 to determine which, if any, of the battery packs connected within the enclosure 200 require heating. When one or more of the battery packs has a temperature below a low temperature threshold value, the control unit 250 is configured to heat the battery pack using one of the first coil 290, second coil 295, and third coil 300. In some embodiments, if one or more of the battery packs connected within the enclosure 200 do not require heating, the enclosure 200 functions as a normal battery pack charger for the battery packs.

Figure 20:
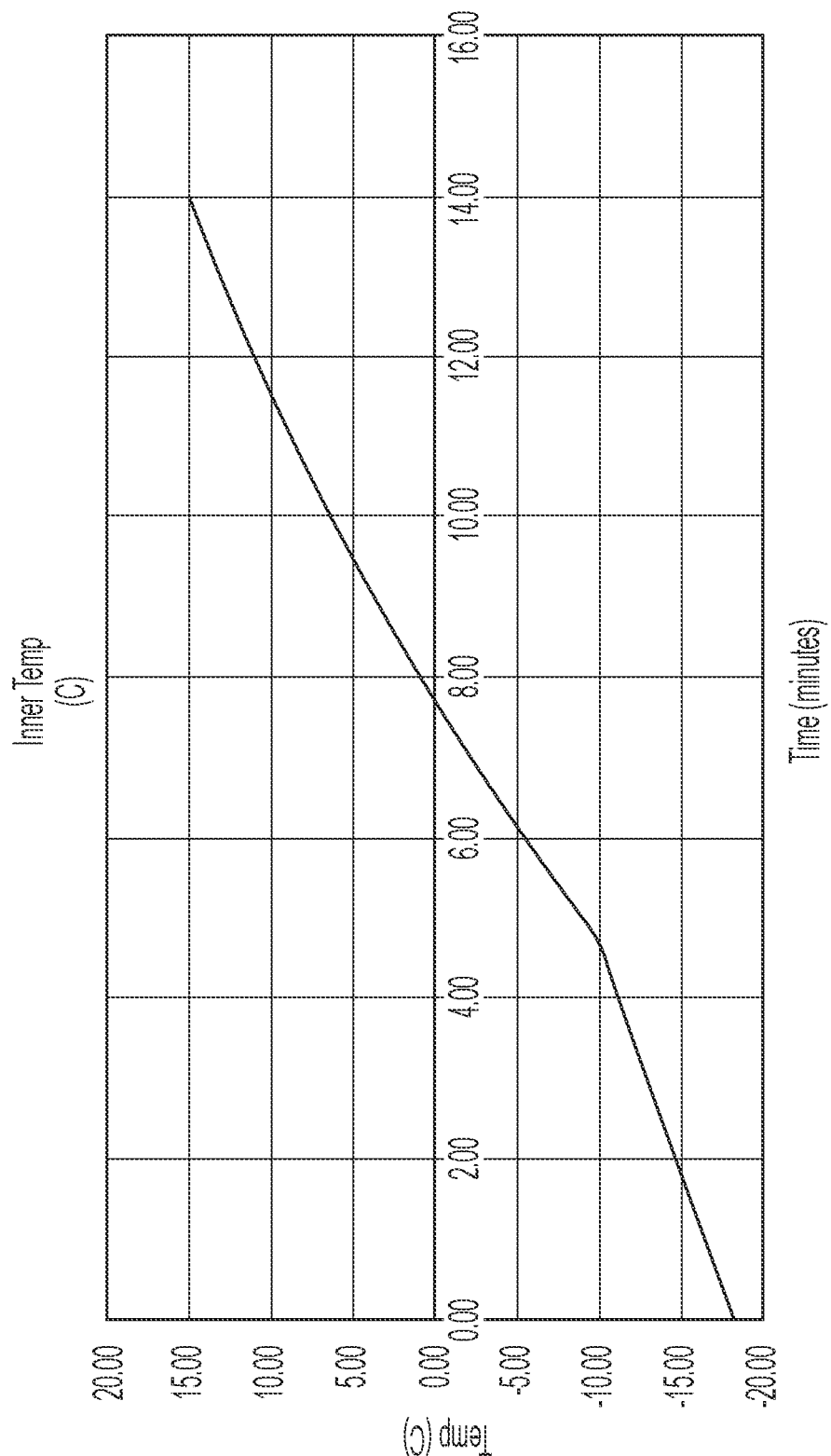
FIG. 20 is an exemplary graph of temperature vs. time during a heating operation of the inductive heating system of FIG. 1 or FIG. 3 with a cold battery cell.
Figure 21:
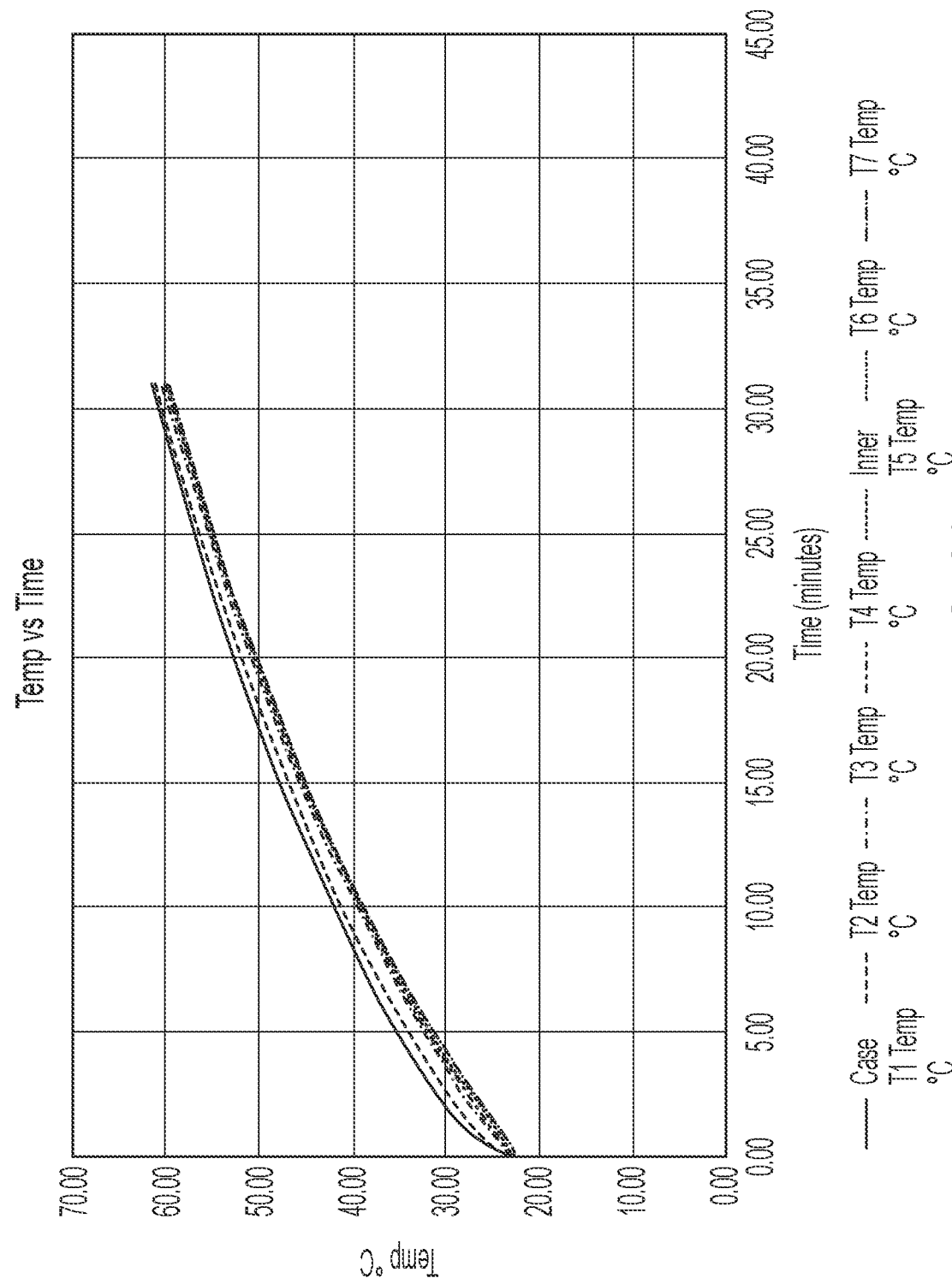
FIG. 21 is an exemplary graph of temperature vs. time during a heating operation of the inductive heating system of FIG. 1 or FIG. 3.

FIGS. 20-21 show exemplary graphs of temperature versus time for the inductive heater assembly 10, 10'. FIG. 20 illustrates the temperature increase of a cold battery cell 26 during heating with the heater assembly 10, 10'. In the illustrated example, the temperature of the battery cell 26 increases from about −18° C. to about 15° C. in about 14 minutes. The 20° C. increase (from about −10° C. to about 10° C.) takes about 6-7 minutes (6 minutes and 50 seconds in the illustrated example).

In the illustrated example of FIG. 21, the temperature of the inductively-heated battery pack 14 rapidly rises more than 30° C. in less than 30 minutes. In FIG. 21, the independent curves represent the temperatures of different individual battery cells 26 within the battery pack 14 at various instances in time. These curves follow the same general form and trend, and the variation between the temperatures of individual battery cells 26 within the battery pack 14 is slight such that the battery pack 14 is substantially uniformly heated via induction.

In the illustrated example, the heater assembly 10, 10' uses about 17 Watts (W) to heat the battery pack 15° C. in about 13 minutes. In testing, under these conditions, "cooking" of the battery cells 26 (e.g., heating or melting of the anode and cathode plates) did not occur.

The heater assembly 10, 10' may operate at a lower power (e.g., 16 W, 13 W, 10 W or less), and the time to heat the battery pack 14 may be extended accordingly. A lower power application may be used for continued or maintenance heating of the battery pack 14 after reaching the specified or predetermined temperature (i.e., the charging temperature threshold). Various AC signals and powers may be applied to the coil portion 114, 114' to achieve different predetermined temperatures under different time restraints.

Figure 22:
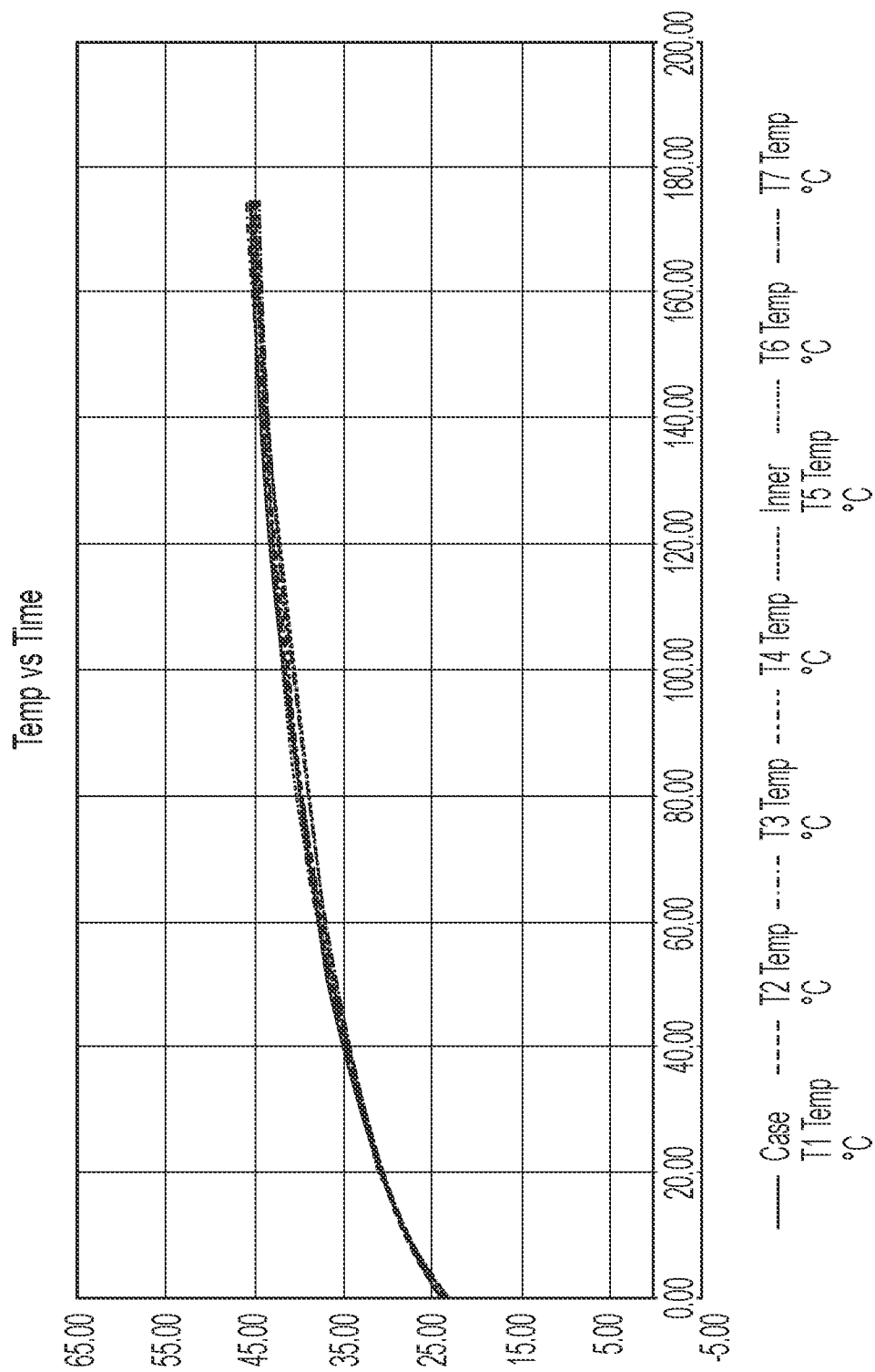
FIG. 22 shows an exemplary graph of temperature vs. time during a heating operation of the inductive heating system when approximately 20% external power is applied.

FIGS. 22-25 show exemplary graphs of the time required to raise the temperature of the battery pack 14 by 60° C. when different percentages of external power are applied to the heater assembly 10, 10'. In the example of FIG. 22, approximately 20% external power is applied to the heater assembly 10, 10' to heat the battery pack 14. The curves representing the temperatures of respective battery cells 26 of the battery pack 14 have gradual slopes, indicating a low level of inductive heating and a relatively slow heating process. The individual battery cell temperature curves gradually level out, indicating that further increase in temperature may be unlikely.

Figure 23:
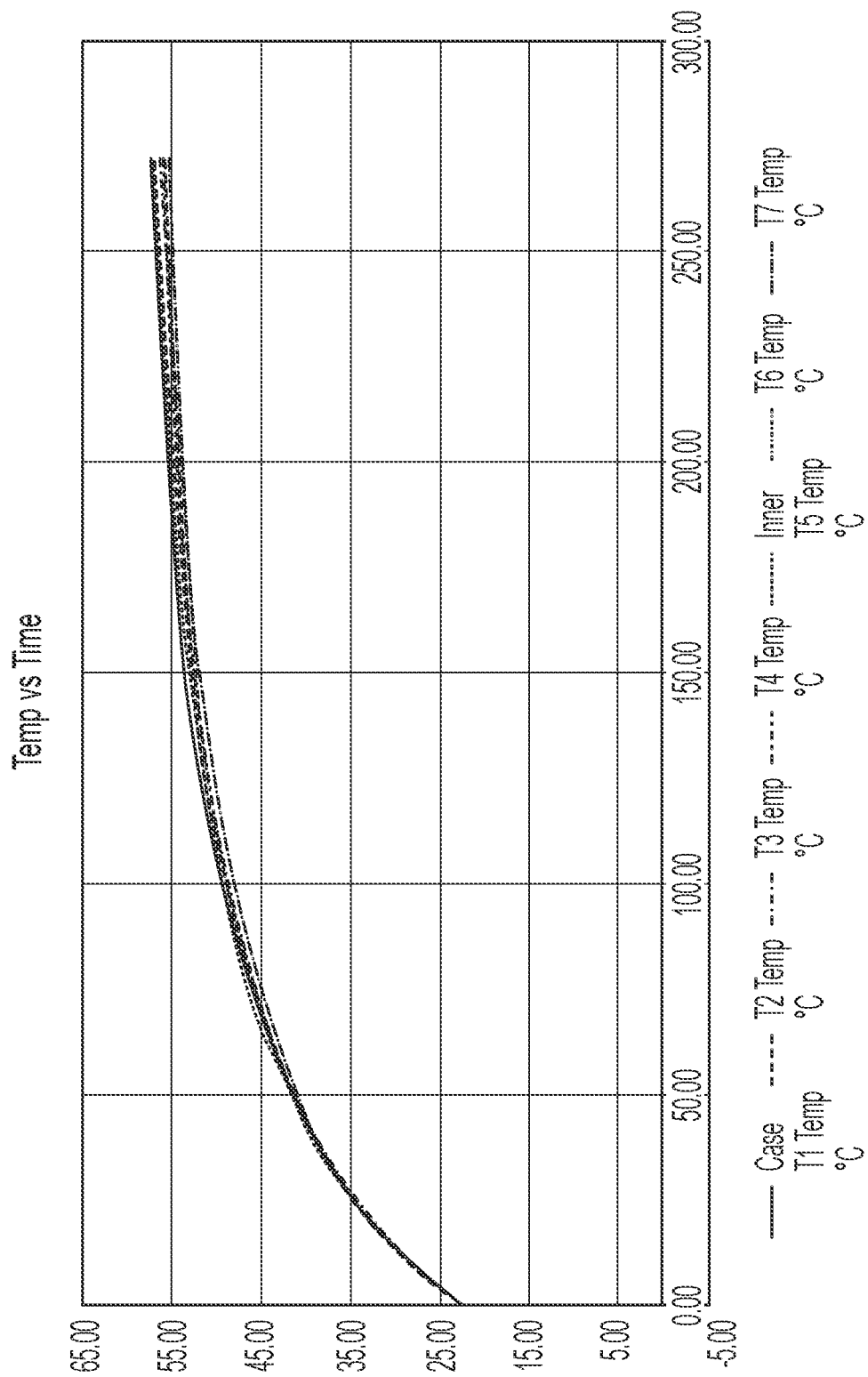
FIG. 23 shows an exemplary graph of temperature vs. time during a heating operation of the inductive heating system when approximately 40% external power is applied.

In the example of FIG. 23, approximately 40% external power is applied to the heater assembly 10, 10'. Although the temperature curves level out below 60° C., the slopes of the individual battery cell temperature curves are significantly steeper compared to those of FIG. 22, and the battery cells 26 reach a higher temperature.

Figure 24:
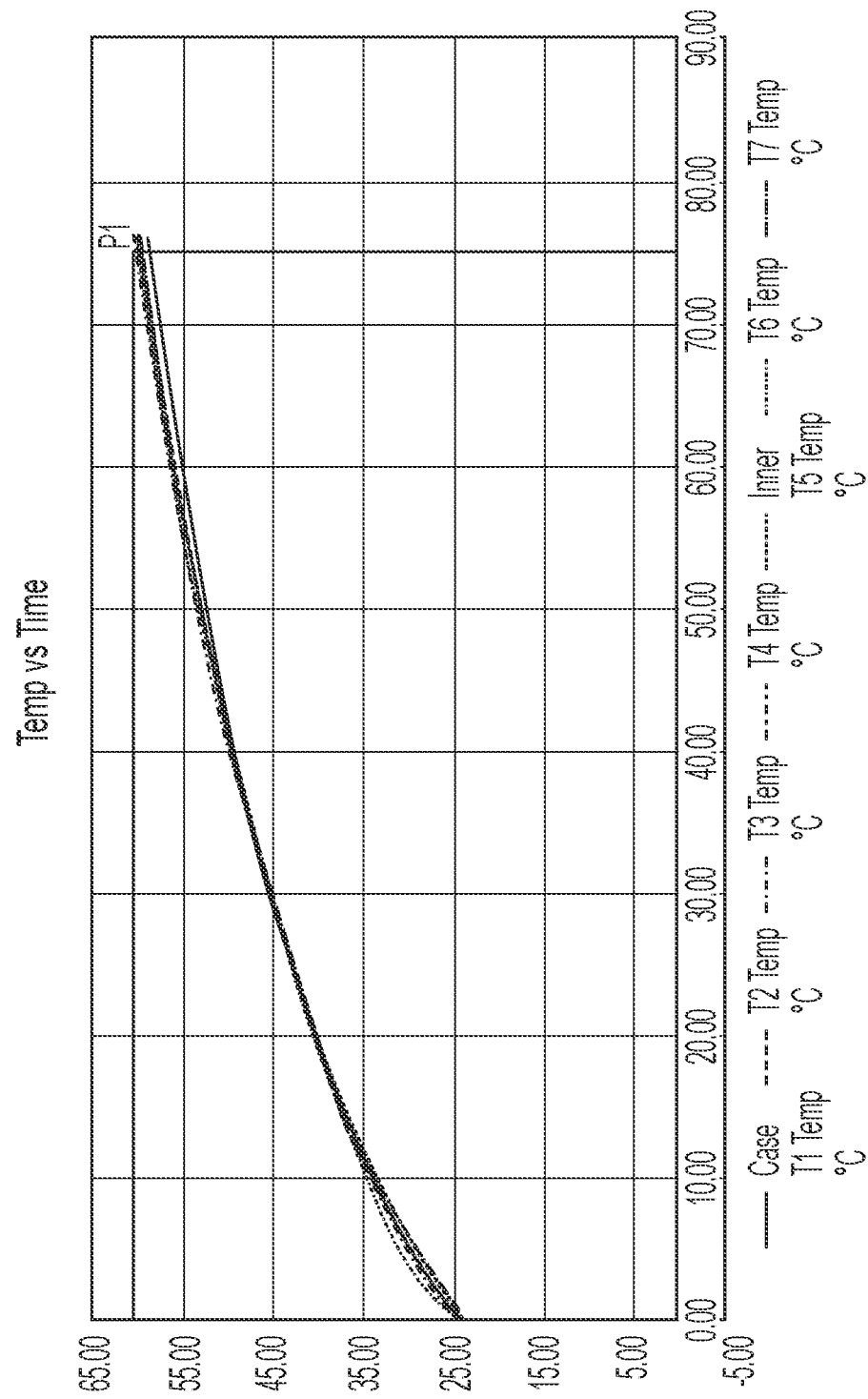
FIG. 24 shows an exemplary graph of temperature vs. time during a heating operation of the inductive heating system when approximately 60% external power is applied.

In the example of FIG. 24, approximately 60% external power is applied to the heater assembly 10, 10', resulting in individual battery cell temperature curves that are steeper and more linear compared to those of FIGS. 21-22. In FIG. 24, battery cell temperature reaches approximately 60° C. at point P1 (at about 75 minutes).

Figure 25:
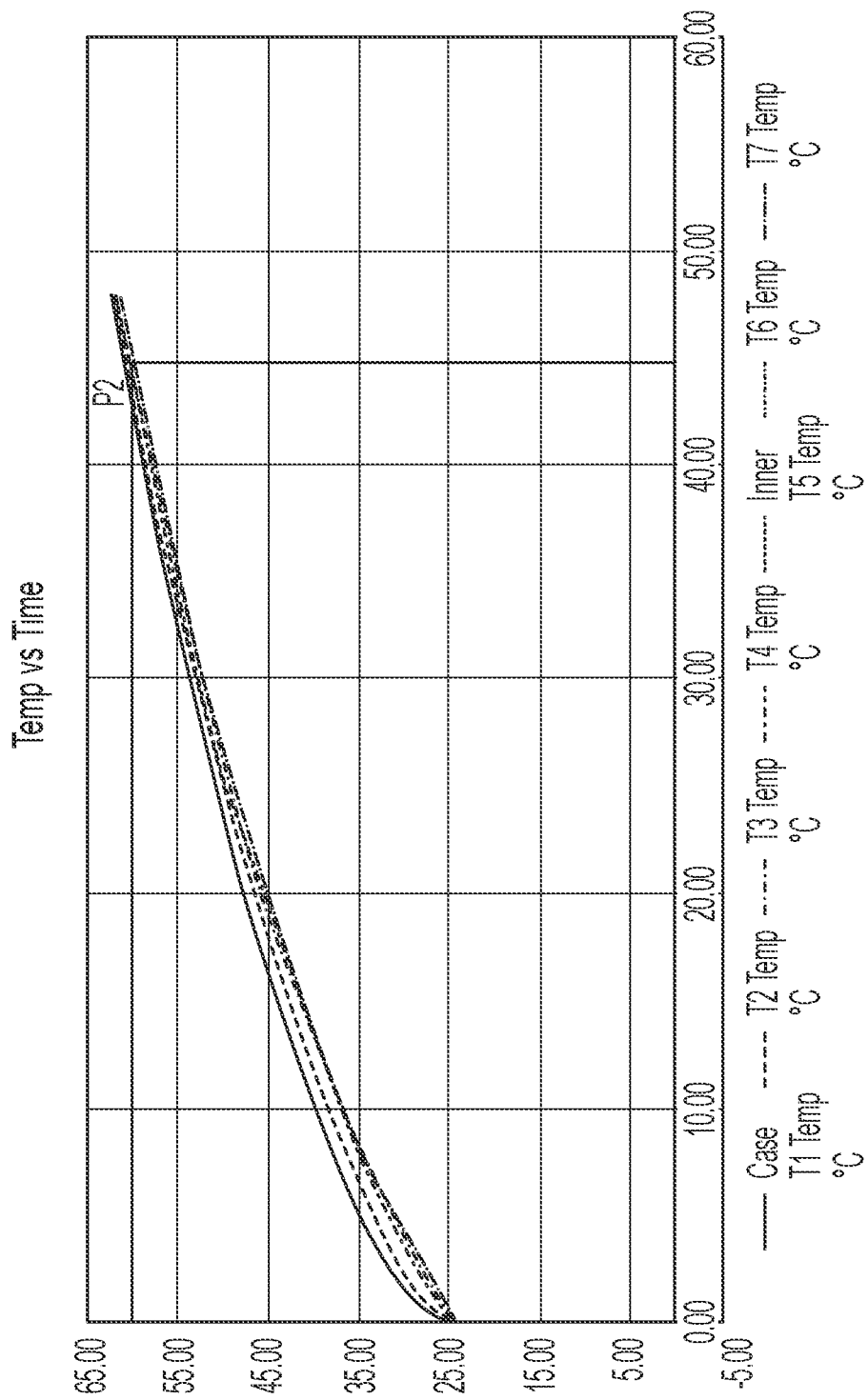
FIG. 25 shows an exemplary graph of temperature vs. time during a heating operation of the inductive heating system when approximately 80% external power is applied.

In the example of FIG. 25, approximately 80% external power is applied to the heater assembly 10, 10', resulting in rapidly increasing individual battery cell temperatures and steeper curves. In FIG. 24, battery cell temperature reaches approximately 60° C. at point P2 (about 45 minutes).

The various independent embodiments of the inductive heater assembly 10, 10' described above may allow for efficient and uniform heating of battery packs in cold environments. The temperature offset achieved using the disclosed inductive heater assembly 10 10' may be predictable and reliable, as shown through the above-described exemplary test results.

It should be understood that the heating of the battery pack 14 may be scaled for speed depending on the amount of power applied to the coil windings 122, 122' from the charger 18. The internal temperature of the battery pack 14 may be easily controlled using the heater assembly 10, 10' and temperature data obtained by temperature sensors of the battery pack 14. It has been found that inductively heating cold battery packs achieves similar results to inductively heating warm battery packs, thereby allowing the disclosed inductive heater assembly 10, 10' to be used to both increase and maintain the temperature of the battery pack 14.

By using a high frequency input current to the coil windings 122, 122', the chemistry and internal elements of the individual battery cells 26 within the battery pack 14 will not be affected. In addition, the induced voltage in the battery pack 14 from the heater assembly 10, 10' has been found to be minimal. These factors may allow for unaltered performance and integrity of the battery pack 14 under inductive heating conditions.

The embodiments described above and illustrated in the figures are presented by way of example only and are not intended as a limitation upon the concepts and principles presented herein. As such, it will be appreciated that variations and modifications exist within the scope and spirit of one or more independent aspects as described.

One or more independent features and/or independent advantages of the application may be set forth in the claims.

What is claimed is:

1. A battery pack charger configured to heat a power tool battery pack, the battery pack charger comprising:
   a housing;
   an adapter portion integrated with the housing of the battery pack charger, the adapter portion configured to mechanically and electrically connect to the power tool battery pack; and
   an inductive heater including a coil portion, the coil portion including a coil housing and one or more inductive coil windings, the inductive heater configured to generate an electromagnetic field to heat the power tool battery pack.

2. The battery pack charger of claim 1, wherein the adapter portion includes a battery pack interface.

3. The battery pack charger of claim 1, wherein the adapter portion is a battery pack interface.

4. The battery pack charger of claim 1, wherein the adapter portion is pivotable relative to the coil portion between an open position and a closed position.

5. The battery pack charger of claim 4, wherein, when the coil portion is in the open position, the adapter portion is exposed, and a battery pack can engage the adapter portion.

6. The battery pack charger of claim 5, wherein, when the coil portion is in the closed position, the battery pack is prevented from engaging and disengaging the adapter portion.

7. The battery pack charger of claim 1, further comprising a temperature sensor configured to sense a temperature related to the power tool battery pack.

8. The battery pack charger of claim 1, wherein the battery pack charger includes an alternating current power input terminal.

9. The battery pack charger of claim 1, wherein the battery pack charger includes at least a second inductive heater.

10. A power tool battery pack charging system, the system comprising:
    a battery pack charger including a housing;
    an adapter portion integrated with the housing of the battery pack charger, the adapter portion including a battery pack interface, the adapter portion configured to mechanically and electrically connect to the power tool battery pack; and
    an inductive heater including a coil portion, the coil portion including a coil housing and one or more inductive coil windings, the inductive heater configured to generate an electromagnetic field to heat the power tool battery pack.

11. The power tool battery pack charging system of claim 10, wherein, the adapter portion is pivotable relative to the coil portion between an open position and a closed position.

12. The power tool battery pack charging system of claim 11, wherein, when the coil portion is in the open position the adapter portion is exposed, and a battery pack can engage the adapter portion.

13. The power tool battery pack charging system of claim 12, wherein, when the coil portion is in the closed position, the battery pack is prevented from engaging and disengaging the adapter portion.

14. The power tool battery pack charging system of claim 10, further comprising a temperature sensor configured to sense a temperature related to the power tool battery pack.

15. A method of inductively heating a power tool battery pack, the method comprising:
    integrating an adapter portion into a battery pack charger;
    coupling an inductive heating assembly to the battery pack charger;
    connecting, mechanically and electrically, the power tool battery pack to the adapter portion; and
    generating an electromagnetic field with a coil winding included within a coil portion of the inductive heating assembly to heat the power tool battery pack.

16. The method of claim 15, wherein the adapter portion is a battery pack interface.

17. The method of claim 15, wherein the adapter portion is pivotable relative to the coil portion between an open position and closed position.

18. The method of claim 15, further comprising:
    generating, using a resonator circuit, a high frequency alternating current signal, the high frequency alternating current signal operable for generating the electromagnetic field with the coil winding.

19. The method of claim 18, wherein the high frequency alternating current signal has a frequency of at least 45 kilohertz.

20. The method of claim 15, further comprising:
    sensing a temperature related to the power tool battery pack; and
    generating the electromagnetic field with the coil winding when the temperature related to the power tool battery pack is less than a charging temperature threshold.

* * * * *